United States Patent
Park et al.

(10) Patent No.: US 8,751,327 B2
(45) Date of Patent: Jun. 10, 2014

(54) FACILITATING CONTENT GENERATION VIA MESSAGING SYSTEM INTERACTIONS

(75) Inventors: Joseph C. Park, Redmond, WA (US); Kian Fai Leong, Singapore (SG)

(73) Assignee: Amazon Technologies, Inc., Reno, NV (US)

( * ) Notice: Subject to any disclaimer, the term of this patent is extended or adjusted under 35 U.S.C. 154(b) by 3018 days.

(21) Appl. No.: 11/396,286

(22) Filed: Mar. 31, 2006

(65) Prior Publication Data
US 2007/0219794 A1    Sep. 20, 2007

Related U.S. Application Data

(60) Provisional application No. 60/784,533, filed on Mar. 20, 2006.

(51) Int. Cl.
*G06Q 30/00* (2012.01)
*G06Q 30/06* (2012.01)

(52) U.S. Cl.
CPC ................................. *G06Q 30/0613* (2013.01)
USPC ..................................................... 705/26.41

(58) Field of Classification Search
CPC ................................................ G06Q 30/0613
USPC ....................................................... 705/26.41
See application file for complete search history.

(56) References Cited

U.S. PATENT DOCUMENTS

| | | |
|---|---|---|
| 5,835,900 A | 11/1998 | Fagg, III et al. |
| 5,862,223 A | 1/1999 | Walker et al. .................. 380/25 |
| 5,893,098 A | 4/1999 | Peters et al. |
| 5,909,679 A | 6/1999 | Hall |
| 6,021,119 A | 2/2000 | Derks et al. |
| 6,026,148 A | 2/2000 | Dworkin et al. |
| 6,029,043 A | 2/2000 | Ho et al. |
| 6,064,978 A | 5/2000 | Gardner |
| 6,223,165 B1 | 4/2001 | Lauffer |
| 6,236,990 B1 | 5/2001 | Geller et al. |

(Continued)

FOREIGN PATENT DOCUMENTS

| | | |
|---|---|---|
| WO | 0120518 A1 | 3/2001 |
| WO | 2004090776 A1 | 10/2004 |

OTHER PUBLICATIONS

"del.icio.us / help / tags", retrieved Feb. 13, 2006, from http://del.icio.us/help/tags, 1 page.

(Continued)

*Primary Examiner* — James W Myhre
(74) *Attorney, Agent, or Firm* — Seed IP Law Group PLLC

(57) ABSTRACT

The following disclosure relates generally to techniques for generating useful content based on user interactions, such as by enabling users to submit questions to and otherwise interact with an answer-providing service. In some situations, one or more interfaces are provided to allow users to specify a variety of types of questions for the answer-providing service, such as via a GUI and/or using a messaging interface based on email or other types of electronic messages. When communications occur via electronic messages, the answer-providing service may in some situations generate and include unique tracking identifiers in electronic messages sent to users, so that the users can reply back to the messages in order to provide a command to the answer-providing service that includes a tracking identifier previously sent to the user and thus verify that the command is sent by someone with access to the electronic messages of the user.

40 Claims, 28 Drawing Sheets

(56) References Cited

U.S. PATENT DOCUMENTS

| | | | |
|---|---|---|---|
| 6,505,166 B1 * | 1/2003 | Stephanou | 705/8 |
| 6,523,010 B2 | 2/2003 | Lauffer | |
| 6,546,372 B2 | 4/2003 | Lauffer | |
| 6,549,889 B2 | 4/2003 | Lauffer | |
| 6,856,986 B1 | 2/2005 | Rossides | |
| 6,901,394 B2 | 5/2005 | Chauhan et al. | |
| 6,938,068 B1 * | 8/2005 | Kraft et al. | 709/203 |
| 7,139,732 B1 | 11/2006 | Desenberg | |
| 7,418,437 B1 | 8/2008 | Marks | |
| 2001/0047354 A1 | 11/2001 | Davis et al. | 707/3 |
| 2002/0161694 A1 | 10/2002 | Yuan | |
| 2005/0086290 A1 | 4/2005 | Joyce et al. | |
| 2006/0004601 A1 | 1/2006 | Marks | |
| 2006/0074890 A1 | 4/2006 | Sundharam | |
| 2007/0174244 A1 | 7/2007 | Jones | |

OTHER PUBLICATIONS

"del.icio.us / popular / reference", retrieved Feb. 13, 2006, from http://del.icio.us/popular/reference, 2 pages.

"del.icio.us / popular / web2.0", retrieved Feb. 13, 2006, from http://del.icio.us/popular/web2.0, 2 pages.

"Google Tests Dial Tone: Search King to Connect Advertisers and Searchers Gratis Via Phone", Nov. 28, 2005, Red Herring: The Business of Technology, retrieved Jan. 5, 2006, from http://www.redherring.com/Article.aspx?a=14634&hed=Google+Tests+Dial+Tone&sector=Industries&subsector=InternetAndServices, 3 pages.

"Google™ AdWords—AdWords Help Center—What Information Does the Traffic Estimator Provide?", retrieved Feb. 24, 2006, from https://adwords.google.com/support/bin/answer.py?answer=8692&topic=1502, 2 pages.

"Google™ AdWords—Choose a Currency", retrieved Feb. 24, 2006, from https://adwords.google.com/select/SetPricing?wizardType=newAccount&wizardKey=ec9a45756acd2216, 2 pages.

"Google™ AdWords—Choose Keywords", retrieved Feb. 24, 2006, from https://adwords.google.com/select/ChooseKeywords?wizardType=newAccount&wizardKey=ec9a45756acd2216, 1 page.

"Google™ AdWords—Create an Ad", retrieved Feb. 24, 2006, from https://adwords.google.com/select/CreateAd?wizardType=newAccount&wizardKey+759fdc3be565329, 1 page.

"Google™ AdWords—Review Your Selection", retrieved Feb. 24, 2006, from https://adwords.google.com/select/ReviewAccount?wizardType=newAccount&wizardKey=ec9a45756acd2216, 2 pages.

"Google Prepares to Provide Local Shopping Information", Nov. 23, 2005, Taipei Times, retrieved Dec. 8, 2005, from http://www.taipeitimes.com/News/worldbiz/archives/2005/11/23/2003281420/print, 2pages.

"Ingenio: Live!Leads™", retrieved Jan. 30, 2006, from http://www.ingenio.com/documents/corp/solutions/liveLeads.asp?TF=1, 1 page.

"Ingenio™ Pay Per Call: Frequently Asked Questions", retrieved Dec. 8, 2005, from http://paypercall.ingenio.com/Help/Faq.aspx#faq0, 4 pages.

"Introducing the Only Shopping Resource with Local Store Product Information and e-Commerce Options: The New ShopLocal.com", Nov. 8, 2005, PRNewswire, retrieved Dec. 8, 2005, from http://www.prnnewswire.com/cgi-bin/stories.pl?ACCT+104&STORY=/www/story/11-08-2005/00 . . . ,3 pages.

"Points and Levels", Yahoo!® Answers, retrieved Feb. 13, 2006, from http://answers.yahoo.com/info/scoring_system, 2 pages.

"Squidoo: The FAQ", retrieved Feb. 13, 2006, from http://www.squidoo.com/pages/faq, 10 pages.

"Tags / wedding / clusters", retrieved Feb. 13, 2006, from http://www.flickr.com/photos/tags/wedding/clusters/, 1 page.

Borland, J., "MSN Buys Into Net-calling Future", Aug. 30, 2005, CNET News.com, retrieved Jan. 30, 2006, from http://news.com.com/MSN+buys+into+Net-calling+future/2100-1032_3-5844873.html?tag=nl, 5 pages.

Hof, R., "Froogle: Shopping Made Complex", Dec. 5, 2005, BusinessWeek Online, retrieved Dec. 8, 2005, from http://businessweek.com/print/technology/content/dec2005/te20051205_849495.htm, 2 pages.

Newcomb, K., "Google Looks to Patent Mobile Click-to-Call Ads", Jan. 12, 2006, ClickZ News, retrieved Jan. 30, 2006, from http://www.clickz.com/news/article.php/3576931, 3 pages.

Smith, G., "Folksonomy: Social Classification", Aug. 3, 2004, retrieved Feb. 13, 2006, from http://atomiq.org/archives/2004/08/folksonomy_social_classification.html, 6 pages.

* cited by examiner

FIG. 2B

Hello Mark | My Dashboard | My Account | Sign Out | HELP

Real-time Agent Request Board  Your account | Total Pay This Month: $4.50

[Search]  257 sort by tag  255  show all details | hide all details | advanced filter

All requests: Displaying 1-50 of 22,121 active requests needing agents to respond.

---

Used Honda Accord in SF  Maximum Pay: $5.00
Tags: used cars shopping classifieds  2 hrs, 35 mins remaining
Requested by: Bill Clark
see more details...  Get Paid: Accept this request

---

Romantic restaurant in Seattle  Maximum Pay: $10.00
Tags: food & dining restaurants Seattle  1 hrs, 12 mins remaining
Requested by: James Lin
see more details...  Get Paid: Accept this request

---

Coporate catering Chinese restaurant in Seattle  Maximum Pay: $8.00
Tags: corporate food Chinese Seattle restaurants  4 hrs, 27 mins remaining
Requested by: Mark Cope
see more details...  Get Paid: Accept this request

---

Buyers Guide to digital camera  Maximum Pay: 20 points
Tags: electronics shopping digital cameras  6 hrs, 5 mins remaining
Requested by: Steve Rapp
see more details...  Get Paid: Accept this request

---

Worth buying a hybrid car?  Maximum Pay: $18.00
Tags: hybrid cars auto environment  3 hrs, 15 mins remaining
Requested by: Dana Carver
see more details...  Get Paid: Accept this request

---

Used Canon Powershot A95.  Maximum Pay: $28.00
Tags: shopping digital cameras camera  0 hrs, 40 mins remaining
Requested by: Sharon Brown
see more details...  Get Paid: Accept this request

---

Should I clean my fuel injectors?  Maximum Pay: $3.00
  1 hrs, 56 mins remaining

Hello Tim Cobbler | My Dashboard | My Account | Sign Out | HELP

My Account     switch to user view
Navigation: Profile | Tools | Work History | Payment History | Personal Dashboard | Forums | HELP  —281

My Profile

Nickname: TC08
Email: Tmc@yahoo.com
Member since: 2004/05/23
Awards
- You've earned gold status in 3 categories:
  Guns & Ammo, Artificial Intelligence and Computer Repair
- You've earned silver status in 3 categories:
  Martial Arts, Politics and Philosophy change photo

My Earnings

Total points: 13,200
This week's points: 1,001

Total earnings: $2,322
This week's earnings: $523

283

Awards

287

You've earned gold status in 3 categories:
- Guns & Ammo: 1,101 points
- Artifical Intelligence: 1,091 points
- Computer Repair: 2,391 points what does Gold Status get me?

You've earned silver status in 3 categories:
- Martial Arts: 899 points (101 points until gold status!)
- Politics: 678 points
- Philosophy: 543 points what does Silver Status get me?

Notification and Keywords

291

Now that you've earned gold and/or silver status, you get access to customized notifications and keyword filtering:

select a category:
[ Guns & Ammo ]

Category: Guns & Ammo

☑ Notify my when a new request comes in in this category
   ☑ Email me at _____ Tmc_@yahoo.com click to change
   ☑ Send me an IM at _____ TC (on AIM) click to change
   ☑ Display an in-browser notification box (what's this?)

☑ Only notify me if the request contains the following keywords:

[                                                    ]

Your Rankings   —289 how do rankings work?

Categories you've earned gold status in:
| Computer Repair | 14th out of 4,113 |
| Guns & Ammo | 34th out of 2,013 |
| Artificial Intelligence | 75th out of 1,020 |

Categories you've earned silver status in:
| Martial Arts | 114th out of 5113 |
| Politics | 134th out of 1013 |
| Philosophy | 178th out of 2020 |

Other categories you've worked in:
| Sports & Recreation | 223rd out of 3020 |
| Real Estate | 178th out of 2020 |
| Automotive | 1,810th out of 2,210 |
| Arts & Entertainment | 1,709th out of 3,020 |
| Shopping | 2,078th out of 2,777 |

Join | Member Sign-In | HELP

J2EE Category                                    Related Categories   administrator
                                                                      architecture
Coldfusion versus J2EE                                                authentication
Requested by: User AAA    Categories: J2EE, Coldfusion                BEA
What to learn Java/J2EE, C#, or VB.Net?                               community
Requested by: User ABC    Categories: J2EE, Java, C#                  design
PHP & My SQL versus JSP, Java                                         develop
Requested by: User BBB    Categories: PHP MySQL JSP, J2EE             developement
Tomcat vs. JBoss vs. BEA Web Logic                                    framework
Requested by: User CCC    Categories: Tomcat JBoss BEA, J2EE          java
                                                                      open source
                                •                                     tomcat
                                •
                                •

Join | Member Sign-In | HELP

Request
✓ All agents have finished working on this request

Request Summary

Asked by: 242 question: "Looking at buying a digital camera and want to find a website or buyer's guide that will teach me what I should be looking for when I make my purchase."
summary: "Buyers Guide to digital camera"
tags: electronics  shopping  digital cameras

Payment

244 — Payment method: Points                                Grand Total: 20 points Responses: 3 agents gave a total of 10 responses, and a digital camera merchant submitted an additional paid response.
view by agent 246 — Paid Response from Merchant:

248a — Camera Merchant ABC currently has 11 Popular Brand Model XYZ Digital Cameras in stock at $199.95 each (as of 3/11/20XX) !
248b — Contact Us at:
Tel: (206) 555-1111
Web: http://cameramerchantABC.com/

Agent Responses:                                                           } 252

250 — : 8009 cumulative pts in these tags
Status: finished

Suggested Website "The three important factors are resolution, features, and    30 mins
price."                                                                         ago "Answer these questions to choose a digital
camera: 1. Megapixels: How do you plan to share

*FIG. 2K*

Example Email-Based Question Submission

- 291a  From: UserABC@yyy.com
- 291b  Sent: Mon 3/5/2006 9:09AM
- 291c  To: ask@rapid-answer.com
- 291d  Subject: What is a good Italian restaurant in downtown Boston that takes reservations and may have availability on short notice?

Example Alternative Email-Based Question Submission

- 291a  From: UserABC@yyy.com
- 291b  Sent: Mon 3/5/2006 9:09AM
- 291c  To: ask@rapid-answer.com
- 291d  Subject: What is a good Italian restaurant in downtown Boston that takes reservations and may have availability on short notice?

- 291e  tags: Italian food, reservations
- 291f  location: Boston
- 291g  payment: 100 points
    ⋮

Example Alternative Email-Based Question Submission

- 291a  From: UserABC@yyy.com
- 291b  Sent: Mon 3/5/2006 9:09AM
- 291c  To: ask@rapid-answer.com
- 291d  Subject: What is a good Italian restaurant in downtown Boston that takes reservations and may have availability on short notice?

- 291h  @Italian food
    ⋮

*Figure 2N*

Example Email-Based Question Responses

- 292a  From: ask@rapid-answer.com
- 292b  Sent: Mon 3/5/2006 9:10AM
- 292c  To: UserABC@yyy.com
- 292d  Subject: (Phone Number) 617-555-1111 (Restaurant AAA) (from UserDEF)

- 292e  RAS Tracking ID: 2341973293-1

---

- 293a  From: ask@rapid-answer.com
- 293b  Sent: Mon 3/5/2006 9:10AM
- 293c  To: UserABC@yyy.com
- 293d  Subject: (Opinion) Restaurant ZZZ is great, and usually has availability (from UserGHI)

- 293e  I eat there often, and the service is excellent, the food is good, and the prices are reasonable. I believe that they were named one of Boston's best value restaurants last year. Be sure to use the valet parking, as street parking is hard to find!

- 293f  RAS Tracking ID: 2341973293-2

---

- 294a  From: ask@rapid-answer.com
- 294b  Sent: Mon 3/5/2006 9:12AM
- 294c  To: UserABC@yyy.com
- 294d  Subject: (Web site) www.restaurantAAA.com (Restaurant AAA) (from UserDEF)

- 294e  RAS Tracking ID: 2341973293-3

Example Email-Based Communications To Provide Feedback

292a  From: ask@rapid-answer.com
292b  Sent: Mon 3/5/2006 9:10AM
292c  To: UserABC@yyy.com
292d  Subject: (Phone Number) 617-555-1111 (Restaurant AAA) (from UserDEF)

292f  UserABC, please provide feedback on this response by selecting a link below:
    Best    Unhelpful    Abusive   ...

292e  RAS Tracking ID: 2341973293-1

---

295a  From: UserABC@yyy.com
295b  Sent: Mon 3/5/2006 9:11AM
295c  To: feedback@rapid-answer.com
295d  Subject: Unhelpful (2341973293-1-1)

---

296a  From: UserABC@yyy.com
296b  Sent: Mon 3/5/2006 9:13AM
296c  To: ask@rapid-answer.com
296d  Subject: RE: (Web site) www.restaurantAAA.com (Restaurant AAA) (from UserDEF)

296e  Unhelpful

| | |
|---|---|
| 294a | From: ask@rapid-answer.com |
| 294b | Sent: Mon 3/5/2006 9:12AM |
| 294c | To: UserABC@yyy.com |
| 294d | Subject: (Web site) www.restaurantAAA.com (Restaurant AAA) (from UserDEF) |
| 294e | RAS Tracking ID: 2341973293-3 |

*Figure 2P*

Example Email-Based Communications To Provide Other Commands

*297a*    From: UserABC@yyy.com
*297b*    Sent: Mon 3/5/2006 9:13AM
*297c*    To: ask@rapid-answer.com
*297d*    Subject: RE: (Web site) www.restaurantAAA.com (Restaurant AAA) (from UserDEF)

*297e*    Buy 10

---

| | |
|---|---|
| *294a* | From: ask@rapid-answer.com |
| *294b* | Sent: Mon 3/5/2006 9:12AM |
| *294c* | To: UserABC@yyy.com |
| *294d* | Subject: (Web site) www.restaurantAAA.com (Restaurant AAA) (from UserDEF) |
| *294e* | RAS Tracking ID: 2341973293-3 |

---

*298a*    From: confirm@rapid-answer.com
*298b*    Sent: Mon 3/5/2006 9:13AM
*298c*    To: UserABC@yyy.com
*298d*    Subject: Please respond to confirm order to buy 10 more questions

*298e*    RAS Tracking ID: 2341973413-1

---

*299a*    From: UserABC@yyy.com
*299b*    Sent: Mon 3/5/2006 9:13AM
*299c*    To: ask@rapid-answer.com
*299d*    Subject: RE: Please respond to confirm order to buy 10 more questions

*299e*    Confirm

---

| | |
|---|---|
| *298a* | From: confirm@rapid-answer.com |
| *298b* | Sent: Mon 3/5/2006 9:13AM |
| *298c* | To: UserABC@yyy.com |
| *298d* | Subject: Please respond to confirm order to buy 10 more questions |
| *298e* | RAS Tracking ID: 2341973413-1 |

*Figure 2Q*

Example Other Email-Based Communications

*281a*  From: ask@rapid-answer.com
*281b*  Sent: Mon 3/5/2006 9:12AM
*281c*  To: UserABC@yyy.com
*281d*  Subject: (Clarification) Do you care more about service or food quality? (from UserJKL)

*281e*  RAS Tracking ID: 2341973293-7

---

*282a*  From: ask@rapid-answer.com
*282b*  Sent: Mon 3/5/2006 9:13AM
*282c*  To: UserABC@yyy.com
*282d*  Subject: (Paid) Restaurant RRR offers the best Italian food in Boston – call us at 617-555-2222, or visit us on the Web at www.restaurantRRR.com (from RestaurantRRR)

*282e*  RAS Tracking ID: 2341973293-8

*Figure 2R*

Example Initial Reward Allocation For Answer To 100-point Question

| 301 Responses | 303 Response Provider User 1 | 305 Response Provider User 2 | 307 Response Provider User 3 | 309 Response Provider User 4 | 311 Response Provider User 5 | 313 Total Points |
|---|---|---|---|---|---|---|
| 315a Link A | 5 | 5 | | 5 | 5 | 20 |
| 315b Link B | 10 | 10 | | | | 20 |
| 315c Phone # | | 20 | | | | 20 |
| 315d Opinion | | | 20 | | | 20 |
| 315e Link C | | | 10 | 10 | | 20 |
| 317 Total Points for the Response Provider User | 15 | 35 | 30 | 15 | 5 | N/A |

*Figure 3A*

Example Revised Answer Reward Allocation After Requester Feedback

| 321 Responses | 323 Response Provider User 1 | 325 Response Provider User 2 | 327 Response Provider User 3 | 329 Response Provider User 4 | 331 Response Provider User 5 | 333 Total Points |
|---|---|---|---|---|---|---|
| 335a Link A Marked: Lame | -10 | -10 | | -10 | -10 | |
| 335b Link B | 12.5 | 12.5 | | | | 25 |
| 335c Phone # | | 25 | | | | 25 |
| 335d Opinion | | | 25 | | | 25 |
| 335e Link C | | | 12.5 | 12.5 | | 25 |
| 337 Total Points for the Response Provider User | 2.5 | 27.5 | 37.5 | 2.5 | -10 | N/A |

*Figure 3B*

Example Revised Answer Reward Allocation After Requester Feedback

| | 341 | 343 | 345 | 347 | 349 | 351 | 353 |
|---|---|---|---|---|---|---|---|
| | Responses | Response Provider User 1 | Response Provider User 2 | Response Provider User 3 | Response Provider User 4 | Response Provider User 5 | Total Points |
| 355a | Link A | 11 | 11 | | 0 | 11 | 33 |
| 355b | Link B | 16.5 | 16.5 | | | | 33 |
| 355c | Phone # | | 33 | | | | 33 |
| 355d | Opinion | | | 0 | | | |
| 355e | Link C Marked: Abuse | | | -50 | -50 | | |
| 357 | Total Points for the Response Provider User | 27.5 | 60.5 | -50 | -50 | 11 | N/A |

*Figure 3C*

Example Initial Revenue Stream Share Determination For Experience Tag of Answer

|  | 401 Response Provider User 1 | 403 Response Provider User 2 | 405 Response Provider User 3 | 407 Response Provider User 4 | 409 Response Provider User 5 | 411 Total |
|---|---|---|---|---|---|---|
| 413 Points | 50 | 1000 | 75 | 20,000 | 800 | — |
| 415 Ranking from Lowest to Highest | 1 | 4 | 2 | 5 | 3 | 15 |
| 417 % of Revenue Payout | 6.7% (1/15) | 26.7% (4/15) | 13.3% (2/15) | 33% (5/15) | 20% (3/15) | 100% |

*Figure 4A*

Example Subsequent Revenue Stream Share

|  | 421 Response Provider User 1 | 423 Response Provider User 2 | 425 Response Provider User 3 | 427 Response Provider User 4 | 429 Response Provider User 5 | 431 Total |
|---|---|---|---|---|---|---|
| 433 Points | 200 | 1500 | 150 | 25,000 (Preferred) | 1000 | — |
| 435 Ranking from Lowest to Highest | 2 | 4 | 1 | 5 | 3 | 15 |
| 437 % of Revenue Payout | 0 | 0 | 0 | 33% (5/15) | 0 | 33% |

*Figure 4B*

FACILITATING CONTENT GENERATION VIA MESSAGING SYSTEM INTERACTIONS

CROSS REFERENCE TO RELATED APPLICATIONS

This application claims the benefit of provisional U.S. Patent Application No. 60/784,533, filed Mar. 20, 2006 and entitled "Content Generation Via Messaging System Interactions," which is hereby incorporated by reference in its entirety.

This application is also related to co-pending U.S. patent application Ser. No. 11/396,342, filed concurrently and entitled "Facilitating Content Generation Via Paid Participation"; to co-pending U.S. patent application Ser. No. 11/396,413, filed concurrently and entitled "Content Generation Revenue Sharing"; and to co-pending U.S. patent application Ser. No. 11/396,316, filed concurrently and entitled "Facilitating Content Generation Via Participant Interactions"; each of which is hereby incorporated by reference in its entirety.

TECHNICAL FIELD

The following disclosure relates generally to techniques for generating useful content based on user interactions, such as by enabling users to submit questions to and otherwise interact with an answer-providing service via email or using other messaging systems.

BACKGROUND

A common problem that arises is to quickly and cheaply find accurate and useful information of interest, such as answers to a wide variety of types of questions. As a result, a variety of information sources and other ways to locate information of various types have been developed, but they are often time-consuming and/or expensive to use, as well as having other problems such as providing only limited types of information, providing information that is inaccurate and/or irrelevant, etc. For example, encyclopedias and reference librarians may provide one possible source of answers, but can be time-consuming and expensive (if they are even available), and are limited in the types of information to which they have access, such as to historical and other reference information of mass interest. Similarly, while online search engines more recently are available to provide information of various types, they often provide information that is inaccurate or irrelevant, are difficult or impossible for many users to effectively use, and are also similarly limited in their ability to retrieve various types of information. For example, such information sources may be ineffective in providing answers to many topical and special-interest questions, such as a list of restaurants of a particular type in a given geographic location that have provided great service during the prior month, suggestions on how best to use particular features on a particular new digital camera that was recently released, or an identification of a physical store in a geographical area that currently have a particular item in stock at a price that satisfies specified criteria.

Other examples of sources of at least some types of information include email lists and newsgroups that are devoted to highly specialized topics, which may allow people to ask questions and later receive responses related to those topics. However, such lists or newsgroups typically do not exist for many subjects of interest, and may be difficult or impossible for infrequent users to identify if they do exist. Even if an appropriate list or newsgroup exists and a user with a question locates it, it may be difficult for many users to submit questions in a form that is acceptable to specialized culture of the list/newsgroup, and responses from others may take days (if they occur at all) and may be hard to find among other activity on the email list or newsgroup. Moreover, such responses are often inaccurate or otherwise inappropriate, since there is typically no feedback mechanism to identify reliable and experienced users (or to penalize users who intentionally or otherwise provide inappropriate responses), and there is typically no monetary or other reward to incentivize the most experienced and diligent users to participate and provide accurate information. In recent years, specialized answer services have developed on the Internet, which may allow questions over varying ranges of topics to be submitted and answered by paid employees or affiliated researchers, but typically suffer from at least some of the same drawbacks as email lists and newsgroups (e.g., limited to only certain topics, responses are slow, responses may be inaccurate, little or no incentives for the most experienced users to provide the most accurate and useful answers, etc.), and may further be costly to use.

Thus, it would be beneficial to provide a solution that enables people to easily find information of interest (e.g., answers to questions), such as to quickly and cheaply obtain accurate answers to questions on a wide range of topics.

BRIEF DESCRIPTION OF THE DRAWINGS

FIGS. 3A-3C illustrate examples of allocations of rewards to users who provide responses to questions of other users.

FIG. 4A-4B illustrate examples of determining portions of an ongoing revenue stream to be shared with users who provide responses that are part of a useful answer.

DETAILED DESCRIPTION

Figure 1:
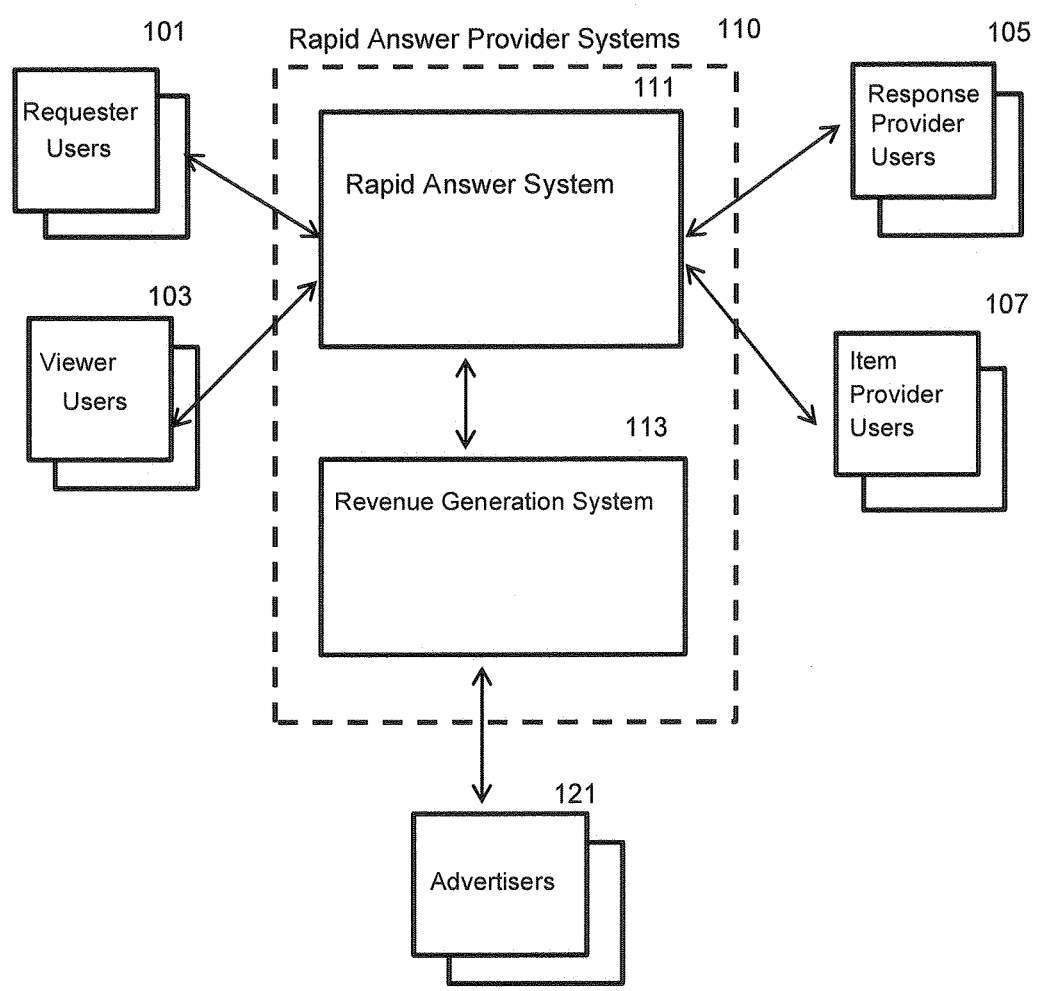
FIG. 1 illustrates interactions between participants as part on an example embodiment of a system for generating useful information and providing such information to users.

Techniques are described that facilitate generating useful content based on user interactions, such as by providing an answer-providing service that facilitates interactions between users who supply questions and users who supply responses to the questions of other users, as well as using the generated content in various ways. In at least some embodiments, one or more interfaces are provided to allow users to specify a variety of types of questions for the answer-providing service, such as via a graphical user interface ("GUI") from a Web site of the answer-providing service and/or using a messaging interface based on email or other types of electronic messages. Various users of the answer-providing service may then view supplied questions and rapidly provide responses, with the responses of multiple users being aggregated or otherwise combined to generate answers for the questions in at least some embodiments. In at least some embodiments, the response provider users who provide responses to questions are unrelated to the question requester users who provide the questions, and both sets of users may be unrelated to the answer-providing service other than being registered for the purposes of making question requests and/or providing question responses.

In at least some embodiments, users may be compensated and otherwise incentivized for participating in interactions with the answer-providing service in various ways. For example, one or more response provider users who each provide one or more responses for use as part of an answer to a question from another user may in at least some embodiments be rewarded in a manner specific to the question and their response(s), such as to split a total amount of monetary reward for the question between the response provider users and/or to split experience points related to the question between the response provider users. In addition, in at least some embodiments a portion of an ongoing revenue stream that is later generated from or otherwise associated with the answer may be shared with the response provider users who provided the responses. As discussed in greater detail below, the splitting of a monetary and/or experience point reward for responses to a question between the response provider users who provided the responses may be performed in various manners in various embodiments, including based at least in part on the uniqueness of the provided responses and/or other measure of the usefulness of the provided responses (e.g., based in part on feedback from the requester user who supplied the question and/or other response provider users who provided responses to the question). Similarly, as discussed in greater detail below, the sharing of an ongoing revenue stream related to an answer may be split between the response provider users who provided the responses used in the answer in various manners in various embodiments, including based on assessed levels of expertise of those response provider users (e.g., as may be measured using a relative amount of experience points allocated to those users based on previously submitting responses to questions). In addition, in at least some embodiments the response provider users with the highest levels of expertise and past participation (e.g., as may be measured using previously allocated experience points for those users) are incentivized to continue participating by assigning one or more enhanced incentive levels to at least some such users, and then providing additional benefits of various types to users having such enhanced status (e.g., to increase the amount of ongoing revenue stream share of an enhanced status user, such as by extending the amount of time that the revenue stream share occurs; to provide additional types of functionality to facilitate responding to questions, such as by providing notifications to enhanced status users of supplied questions meeting specified criteria; etc.). Various other techniques may similarly be used to incentivize high-quality responses and the continued participation of the most valuable users in at least some embodiments, as well as to generate types of content other than answers to questions, as discussed in greater detail below.

In at least some embodiments, answers may be categorized in various ways and for various purposes, such as to allow users to easily locate and/or access previously-answered questions in a particular category, and to assist in tracking and evaluating the expertise of response provider users in a manner specific to particular categories. In some embodiments, the categorizing of an answer is performed based at least in part on input supplied by the requester user who supplied the question associated with the answer and/or on input supplied by the response provider users who supply responses used as part of the answer. For example, in some embodiments a requester user who supplies a question may indicate one or more tags related to the question, and those tags may be used as user-designated categories for the question and its subsequent answer (e.g., as part of a group of free-form categories that are incrementally developed based on user input). Subsequently, the one or more categories for a question from the requester-supplied tag(s) may assist response provider users in identifying the question as being of interest to answer. In addition, response provider users may supply one or more other tags for the question and its answers, which similarly may be used as user-designated categories (e.g., by selecting one or more of the most popular tags supplied by all of the response provider users). Categorizing of answers may further be based in at least some embodiments by comparing answers (and their constituent responses) to the answers of other questions, such as to cluster or group similar answers and to combine or otherwise group related tags or other category information for answers that are sufficiently similar. Such grouped or otherwise related tags and other category information may further be used in various manners in various embodiments, such as to suggest appropriate tags to requester users and/or to response provider users based on the suggested tags being related to user-supplied tags and/or other information associated with an answer (e.g., text of the question corresponding to the answer). Additional details related to categorizing of answers are included below.

In some embodiments, other users of the answer-providing service may provide information that is related to specific questions and answers, such as by allowing item provider users (e.g., representatives of merchants) to pay in order to have their responses or other information (e.g., advertisements) included in the answers of questions that the item provider users select, such as part of a pay-per-response functionality in which an item provider user affirmatively responds for each question of interest that indicated information is to be included in the answer for the question before the item provider user is charged for the information inclusion. While the item provider users who pay to include information in answers for selected questions are typically distinct from the response provider users who are compensated or otherwise rewarded for providing responses for questions, in some embodiments there may be overlap between groups of users such that a single user performs multiple roles at different times (e.g., to at times act as a requester user, as a response provider user, as an item provider user on behalf of one or more item providers, and as a viewer user). Such items may include products, services and/or information that are available for purchase, rent, lease, license, trade, evaluation, sampling, subscription to, etc., whether from a physical brick-and-mortar merchant at a particular geographical location or from a Web store of an online merchant or another type of electronic marketplace (e.g., for electronic ordering and delivery via appropriate physical distribution channels or electronically as appropriate, such as shipment via a governmental postal service or private common carrier for physical products, or such as via download over the Internet for digital products such as digital music, videos, or e-books). Correspondingly, the item providers provide such items to others, and may include product-oriented and/or service-oriented businesses or other organizations or entities, with an item provider user being a user who is a representative of an item provider or who otherwise acts on behalf of an item provider. In particular, in some embodiments an item provider user may indicate criteria of interest for use in automatically identifying matching questions and a specified bid or other monetary amount for use with pay-per-response functionality, such that the item provider user desires to receive an option for each of the matching questions to provide a response in exchange for payment from the item provider user of the specified monetary amount if the item provider user so elects. Question matching criteria may be specified in various ways, including keywords to match tags and/or categories that are associated with an answer (or its corresponding question before the answer is generated), or to instead match other information associated with a question/answer, such as to directly match the question content (e.g., the text of the question) and/or to match metadata related to the requester user who provided the question (e.g., the geographic location of the requester user) and/or one or more response provider users who respond to the question in other than a pay-per-response manner. When a given question matches previously specified criteria of one or more item provider users, at least some of the one or more item provider users that specified the criteria may each be notified of the question as well as possibly an option to provide a response to the question in exchange for payment (e.g., a monetary amount that was previously bid or offered by the item provider user). Additional details related to actions of item provider users and pay-per-response functionality are discussed in greater detail below.

FIG. 1 illustrates interactions between participants as part on an example embodiment of a system for generating useful information and providing such information to users, such as by illustrating examples of various data flow between an embodiment of a Rapid Answer answer-providing system 111, requester users 101 who provide question requests, and response provider users 105 who provide responses to the questions for use in the questions' answers. In this example embodiment, other participants are also illustrated, including item provider users 107 who provide responses or other information for some questions and/or answers on a pay-per-response basis, viewer users 103 who access and review previously supplied answers to others' questions, advertisers 121 who pay to provide advertisements to be included with at least some questions and/or answers (e.g., those supplied to the viewer users) and thus provide ongoing revenue streams related to those questions and answers, and a revenue generation system 113 that interacts with the advertisers to generate revenue based on the generated answers and other generated content of the Rapid Answer system. Revenue may be generated from the advertisements provided by the advertisers 121 in various ways, such as by displaying advertisements along with questions and/or answers, and with the revenue for the advertisements reflecting a fixed fee or instead one or more types of usage-based models reflecting use of the advertisements. For example, the usage-based models may include a pay-per-click model (e.g., advertisers only pay for advertisements that are selected by viewing users), a pay-per-impression model (e.g., advertisers pay for every advertisement that is displayed), a pay-per-sales model (e.g., advertisers only pay for advertisements that result in actual sales), etc. Revenue may also be generated in other ways, including payments received from requester users and/or item provider users, sponsored links, etc.

In this example, the Rapid Answer system 111 and the revenue generation system 113 are both provided by the same entity as part of the systems 110 of that provider, and the systems 110 may in some embodiments contain additional systems or components that are not shown, such as a payment system or systems for other services. Various messages may occur between the illustrated systems and users, and may be performed in various ways in various embodiments (e.g., in an interactive manner based on one or more GUIs of the Rapid Answer system; based on an exchange of messages using email or other types of electronic messaging, such as IM ("instant messaging"), SMS ("short message service") or MMS ("multimedia messaging service"); in a programmatic manner based on electronic communications sent via one or more APIs ("application programming interfaces"), such as based on Web services; etc.).

In addition to supplying question requests, requester users may each further interact with the Rapid Answer system in various ways in at least some embodiments, such as by receiving answers to their questions, providing feedback related to the answers (e.g., to provide positive or negative feedback related to particular responses and/or response provider users), and viewing information about a user account of the requester user with the Rapid Answer system.

In addition to supplying responses to others' question in exchange for compensation or other rewards, response provider users may each interact with the Rapid Answer system in various ways in at least some embodiments, such as by identifying supplied questions of interest that are not yet answered (e.g., questions in categories in which the response provider user has expertise or would like to expand their expertise), providing feedback related to questions and answers (e.g., proposed tags or other category information for questions to which they are responding, positive or negative feedback regarding responses and/or proposed tags/categories of other response provider users, etc.), and receiving a share of ongoing revenue streams generated for questions to which they previously responded.

In addition to paying to include information in answers to questions that are individually selected, item provider users may each interact with the Rapid Answer system in various ways in at least some embodiments, such to designate categories or other criteria related to questions for which the item provider user desires an opportunity to elect to provide a response or other information in exchange for a designated payment (e.g., questions related to items that the item provider user sells or otherwise provides), receive notifications of options to respond to particular questions and to optionally respond to those questions in exchange for designated payment from the item provider user, and provide payment of money or other items of value to reflect elections by the item provider user to provide responses for particular questions. Item provider users may be distinguished from response provider users in various ways, including that item provider users may pay to provide responses to others' questions whereas response provider users may be paid or otherwise rewarded (e.g., by obtaining experience points) for providing responses to others' questions.

Viewer users may each interact with the Rapid Answer system in various ways in various embodiments, such as by accessing and viewing previously answered questions of others that may optionally be accompanied by advertisements. Advertisers may include the actual parties on whose behalf the advertisements are shown, as well as brokers or other intermediates who act on behalf of others (e.g., via affiliate programs, or by acting as a service that sells advertising), and may similarly each interact with the Rapid Answer system and/or a related system (e.g., a revenue generation system) in various ways in various embodiments.

For illustrative purposes, some embodiments are described below in which various specific types of content are generated in various specific ways based on specific types of interactions with users, such as by providing incentives to encourage response provider users to provide answers to questions, by providing pay-per-response functionality in which item provider users pay to provide responses to questions, and by categorizing answers in various ways to facilitate access by various users. However, it will be understood that the described techniques can be used in a wide variety of other situations, and that the inventive techniques can be used in a wide variety of other situations, including to generate other types of contents based on other types of interactions with users.

Figure 2A:
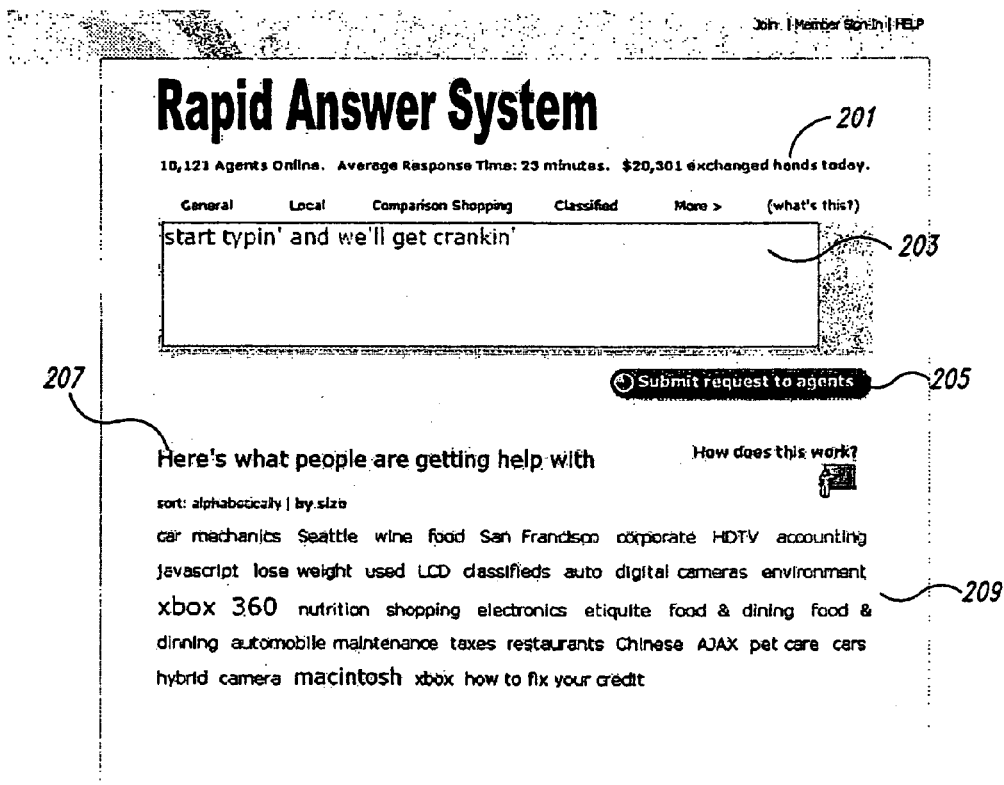
FIGS. 2A-2R illustrate examples of interactions between participants as part of an embodiment of a system for providing information of interest to users, such as based on use of a graphical user interface provided by the system and/or based on a messaging interface provided by the system.

FIGS. 2A-2K illustrate examples of interactions between an embodiment of the Rapid Answer answer-providing system and various types of users, such as via a GUI provided by an embodiment of the Rapid Answer system. In particular, FIG. 2A illustrates an example GUI screen or page (e.g., a Web page) from which a requester user can initiate submission of a question to be answered. The example display includes an information section 201 related to overall operation of the rapid answer system, a section 203 in which a requester user can specify a question, a user-selectable control 205 with which a requester user can initiate submission of a question specified in section 203, and overview information 207 about numerous popular user-supplied categories 209 (e.g., based on recent questions). The information section 201 in this example provides details about the number of response provider users (also referred to as "agents") that are currently online and ready to respond to questions, an average response time to provide a completed answer for a question, and an indication of a volume of transactions that have occurred, and additional related information may also be displayed in some embodiments (e.g., the number of viewer users or number of open questions that are available to be answered). The categories 209 may be organized in various manners (e.g., by alphabetical order, by popularity, etc.), and in some embodiments may be only a single word, while in other embodiments phrases such as "food and dining" may be used as a category. In addition, in at least some embodiments in which users are permitted to specify free-form categories, the categories may include misspelled words (e.g., as part of the displayed "food & dinning" category) or highly unusual words, but such categories will typically quickly fall in relative popularity to other categories that are used more frequently, and in other embodiments such unusual categories may not be used (e.g., by performing a spell-check and/or other analysis of user-supplied categories, by selecting categories from a predefined list or hierarchy, etc.).

Figure 2B:
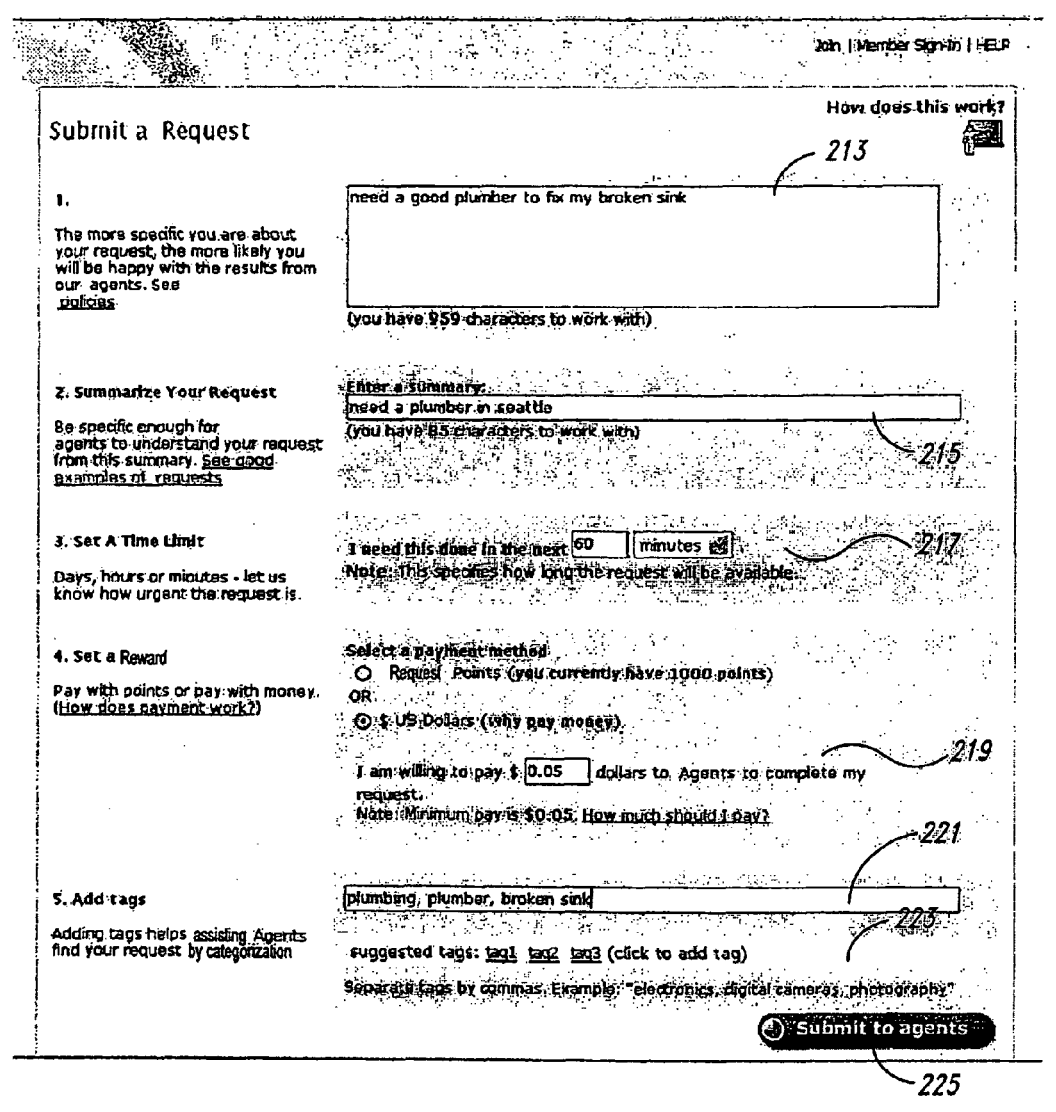

FIG. 2B illustrates an example GUI screen or page that is displayed to a requester user to provide various details related to a question being submitted, such as after selection of the user-selectable control 205 of FIG. 2A. In addition, while not illustrated here, in some embodiments a requester user may be prompted to sign on to the Rapid Answer system prior to or during submission of a question request, such as if the user has an established account with the Rapid Answer system to track information about financial information for the user, past user activities with the system, user preferences, etc. In this example, various sections of the GUI are displayed to prompt the requester user to provide various information, including to specify a question to be answered in section 213 (which may be automatically filled in with the question text entered in section 203 in FIG. 2A), to provide a summary of the question in section 215, to provide a time limit for completing an answer for the question in section 217, and to specify a reward in section 219 that will be provided to at least some response provider users who provide responses that are used in the answer to the question. The example GUI also includes a section 221 in which the requester user can specify one or more tags for use in categorizing the question, such as tags to be used as the categories in such embodiments, or tags to be used to select related existing categories in other embodiments. In addition, in the illustrated example tags may also be suggested in section 223 (e.g., to reflect popular existing tags or other categories), such as based at least in part on words in the question text and/or summary, and a user-selectable control 225 may be used to submit the question to the Rapid Answer system and to be made available to response provider users.

In at least some embodiments, when a time limit is specified by a requester user, the Rapid Answer system may take various actions to provide an answer within that time, such as to close availability of the question to additional response provider users and responses near or at the end of the time limit even if fewer than a predetermined or requested number of responses have been received or if fewer than a predetermined (e.g., 10) or requested number of response provider users have responded. In addition, a requester user may be able to offer a reward for an answer to a submitted question in various ways in various embodiments, such as to specify a monetary amount to be paid and/or an amount of Rapid Answer system points to be provided, or instead each question may be assessed an amount of money and/or a number of points by the Rapid Answer system (e.g., with the reward for each question being the same, or with the reward instead varying based on the categories for the question and/or other information related to the question). As discussed in greater detail below, a reward that includes Rapid Answer system points may provide various types of benefits to response provider users, and a requester user may obtain such points to be provided in various ways (e.g., by receiving a specified amount of points for free, such as an initial allocation or a recurring number of points for each successive specified time period; by purchasing them for monetary payment; by earning them based on other activities of the requester users; etc.) In addition, in at least some embodiments both the question and the summary may be limited to a predetermined number of characters (e.g., 959 characters for the question and 85 for the summary), and a summary separate from the question may not be used in at least some situations (e.g., if the question text is sufficiently short). Additional information may also be supplied or specified in some embodiments, such as a geographic location of the requester user, or criteria related to which response provider users provide responses (e.g., specified desired or required qualifications of the response provider users, such as an experience level or other qualification; an indication that the response provider users have previously performed some indicated task or action, such as to have answered indicated related prior questions; etc.) and/or how the answer for the question is to be generated. Requester users may in some embodiments make the reward dependent on the time to obtain an answer, such that the requester user pays a premium to have the question answered sooner rather than later.

Figure 2C:
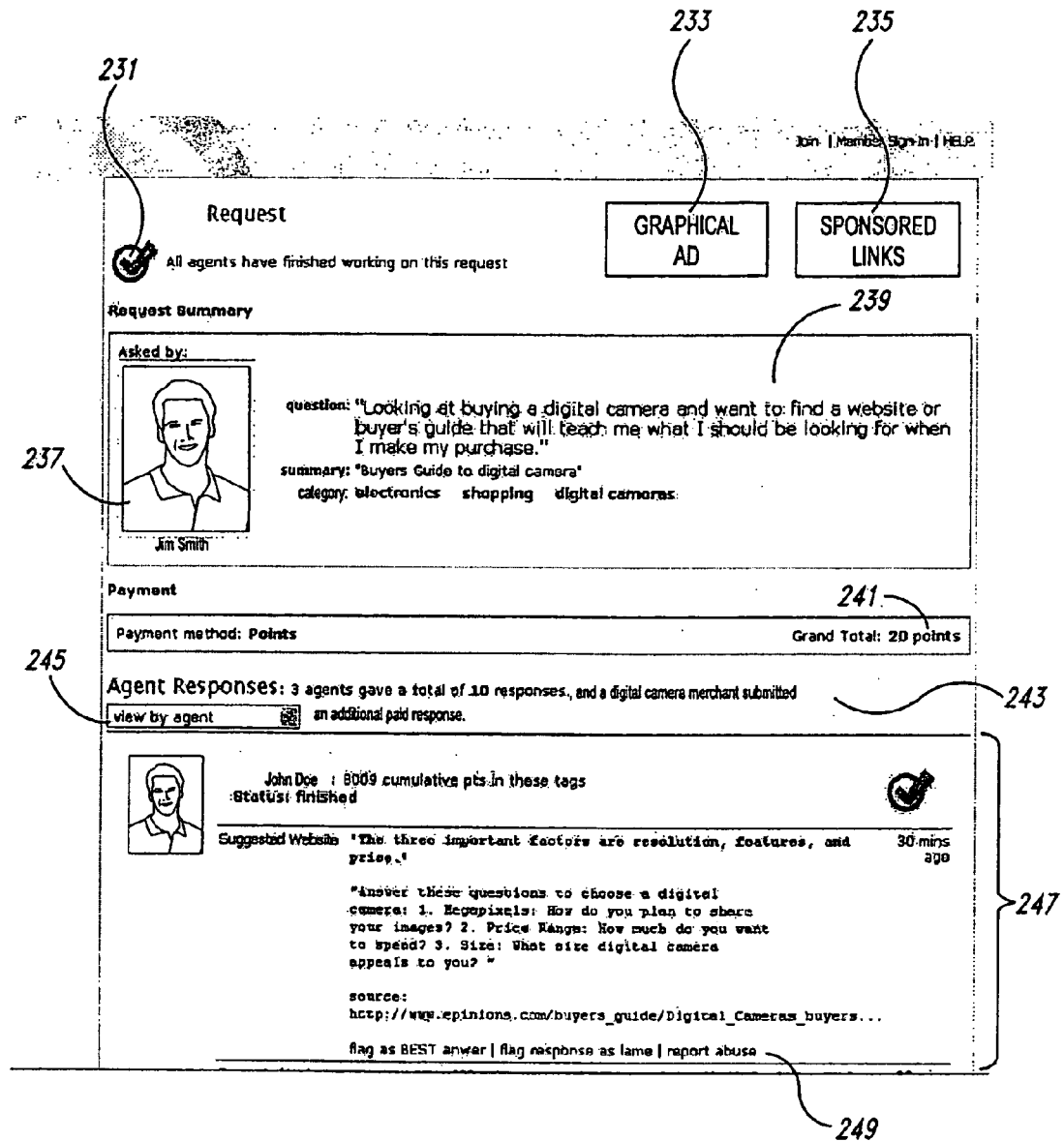

FIG. 2C illustrates an example GUI screen or page that displays a portion of the answer to a question, such as to the requester user who submitted the question. In particular, the example information includes a status indicator 231 to indicate the status of completion of the answer, one or more graphical advertisements 233, one or more sponsored textual links 235, an image 237 of the requester user who submitted the question, question information 239, reward information 241, a summary section 243 about the responses that make up the answer, a user-selectable control 245 to sort the responses, a first 247 of the question responses that make up the answer, and user-selectable controls 249 to provide feedback about the answer. In this example, the requester user may provide feedback to indicate that a particular response is the best of all responses, is lame (e.g., irrelevant, off-topic, poorly written, etc.) or otherwise unhelpful, or is abusive (e.g., includes offensive language, is wholly unrelated to the question, or otherwise violates any rules or conditions associated with provided responses), although in other embodiments other types of feedback may instead be permitted (e.g., a relative and/or absolute ranking of various of the responses with respect to one or more attributes being measured, such as usefulness; a ranking of one or more of the response provider users based on their responses; etc.). In some embodiments, the sponsored links and/or graphical advertisements may be from item provider users and/or from other sources, such as advertisers, while in other embodiments the information provided by item provider users will instead be similar to or identical to the types of responses that are received from response provider users, and may be displayed together with those other responses. In addition, the information that is displayed may vary in other embodiments, such as to not display the requester user image and/or various details of the question (e.g., the question text or associated metadata such as tags or other categories, the summary, etc.).

In some embodiments, the requester user who asked the question may view responses as the responses are incrementally received by the Rapid Answer system, while in other embodiments the response information is not provided to the requester user until the question has been fully answered (i.e., all responses to the question have been received and any aggregation or other processing of the responses has been completed). In embodiments in which other users may view such answers, such as a viewer user, the displayed information may be similar but may lack some details, such as the ability to provide feedback about the answer or to incrementally receive responses as they are received. In addition, in at least some embodiments, users other than the requester user who submitted the question may only obtain information about the question and its answer after the answer has been completed, such as to prevent potential or actual response provider users from obtaining information about responses provided by other response provider users. Furthermore, in some embodiments at least some requester users may receive only a single response to a submitted question, such as the only response that is supplied by a single response provider user, or instead a single response that is one of multiple responses supplied by one or more response provider users, such as one response that is selected as the best or that is otherwise preferred over the other responses based on specified criteria (e.g., the first response received by the Rapid Answer system, the response from the response provider user with the highest enhanced status, the response for which an item provider user is willing to pay the most and/or for which a response provider user is willing to perform for the least reward, etc.).

FIG. 2D illustrates an example GUI screen or page that allows a response provider user to identify currently open questions that are available to the response provider user to select for providing responses. In particular, in this example the displayed information includes a section 253 in which the response provider user can specify information for a search of available questions (such as based on a search of tags or other categories, of text of the questions, and/or of any other metadata associated with the question); a user-selectable control 255 to sort or arrange open questions by tag or other category information; user-selectable controls 257 to control which open questions are included in the displayed list 259 and to control a level of detail that is shown for each question, and an indication 251 related to the response provider user's account and/or past activity (in this example to illustrate an amount of money earned from providing responses to questions so far during the current month). Each of the displayed questions currently include various details that include a summary, tags or other category information, the requester user for the question, a maximum associated reward for all responses to the question, a time remaining to answer the question, and a user-selectable control to initiate a process of providing one or more responses for the question. The response provider user may in at least some embodiments be able to search for and/or sort questions in a variety of ways, such as by one or more categories, by time remaining to answer the question, by the value of the reward, by one or more geographic locations associated with the questions, etc. User-selectable controls may also be available in at least some embodiments to control a level of detail that is displayed for each question, and in some embodiments selected open questions may be automatically displayed to the response provider user by default (e.g., to reflect areas of expertise and/or specified preferences of the response provider user). In addition, when a question becomes currently unavailable (e.g., due to a maximum time having expired or a maximum number of response provider users having selected the question to provide responses), the question may in some embodiments no longer be displayed to response provider users, while in other embodiments the question may be displayed but the response provider user may not be allowed to select to provide response(s) to the question.

Figure 2E:
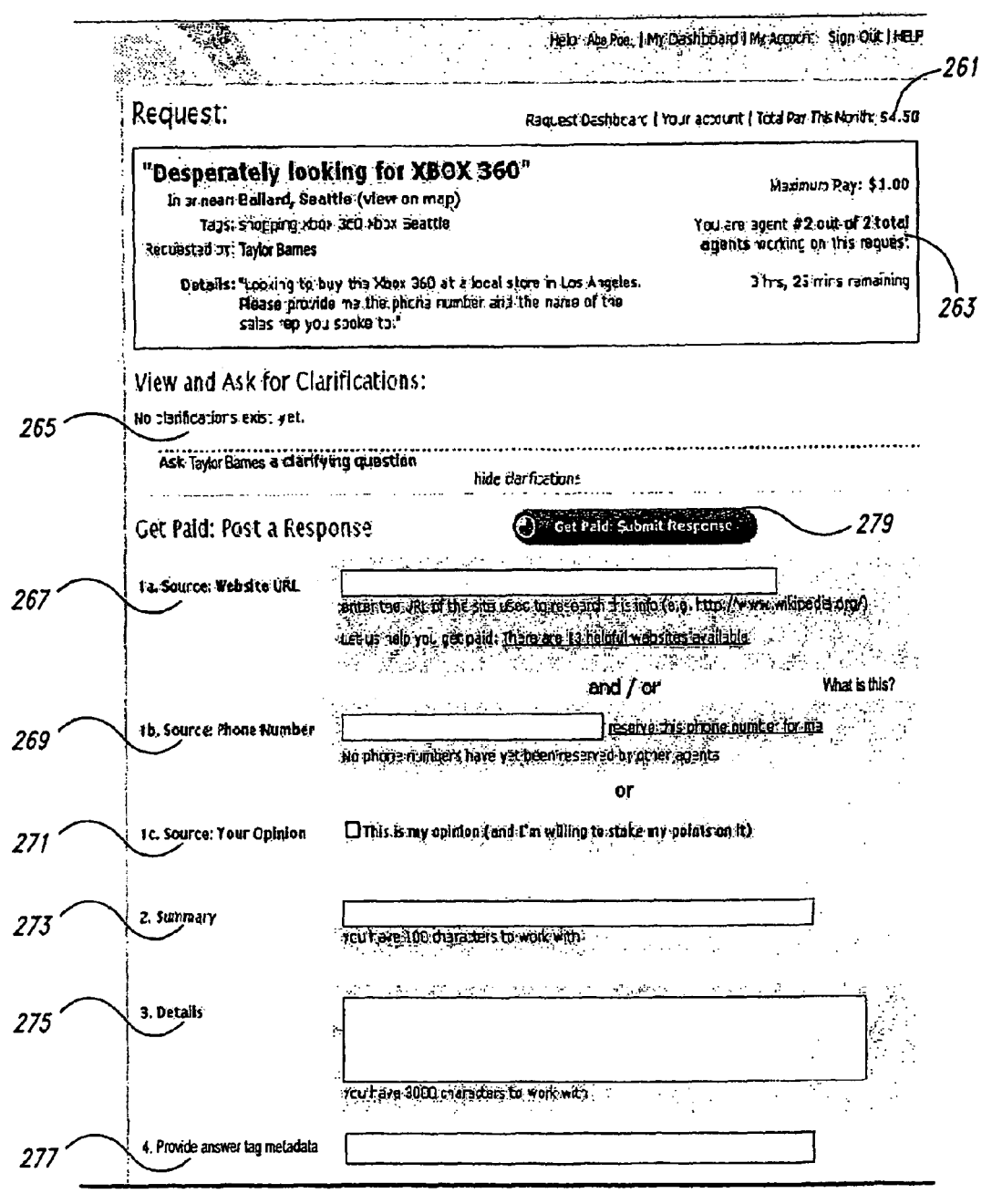

FIG. 2E illustrates an example GUI screen or page that allows a response provider user to provide one or more responses to an open question. In particular, in this example the displayed information includes various information 263 related to the unanswered question (such as the question details, tags or other category information, associated monetary reward, and time remaining before expiration, as well as in this example to provide status information about a current degree of completion of the answering process), a section 265 via which question clarifications can be requested and viewed, a section 277 with which the response provider user can specify one or more tags for use as possible categories to associate with the answer, and information 261 related to the current response provider user's account and/or past activity (in this example to illustrate an amount of money earned from providing responses to questions so far during the current month). In addition, the displayed information includes various sections via which the response provider user can supply one or more responses for the question, including a section 267 with which the response provider user can specify a URL of a site having information related to the answer, a section 269 in which the response provider user can specify a phone number related to the question (e.g., the phone number of an item provider related to the question, such as in this example to include a phone number of a local store in Los Angeles that has Xbox 360 items available), a section 271 to indicate that a response being provided is the response provider user's opinion (with the opinion being specified in a summary section 273 and a details section 275), and a user-selectable control 279 to submit one or more responses that have been specified.

In some embodiments, various additional types of information sources or other types of responses may be provided, and the Rapid Answer system may further assist response provider users in various ways, such as by indicating potentially helpful Web sites (e.g., based on URLs from previous answers with the same or similar categories, or based on being generally useful reference sites). In addition, in some embodiments a response provider user may be able to reserve a phone number (e.g., for use as a response to the current question, such as while the response provider user is preparing additional response information for the current question, or instead for future use with other responses), such as if a particular phone number may only be submitted by one response provider user for each question in some embodiments. In this example embodiment, the Rapid Answer system also allows response provider users to ask for clarifications from the requester user who submitted the question, such as if the requester user left out important information or if the question is too broad to be reasonably answered, and any clarifications received may be visible to all actual and/or potential response provider users.

Although in this example space is provided for one URL and/or one phone number, in some embodiments a response provider user may be able to supply multiple URLs, phone numbers, and/or other sources of information, such as other types of contact information (e.g., street and/or mailing addresses, e-mail addresses, etc.). Furthermore, in some embodiments a response provider user may need to provide his/her entire group of multiple responses to the question together at a single time, while in other embodiments the response provider user may be able to submit responses at multiple times. In addition, in some embodiments the responses may need to be formatted in specific manners, such as to format a phone number as (###) ###-####—in such embodiments, an example may be provided and/or client-side scripting (e.g., JavaScript) may be used to dynamically monitor and optionally modify a response so that it is in the correct format. In some embodiments, the Rapid Answer system may similarly restrict some responses for various reasons (e.g., to restrict inappropriate answers), such as to not accept aliased URLs that will redirect a browser to a different URL. In addition, the system may have various security measures to prevent spamming of responses with off-topic advertisements or other responses.

While not illustrated here, in some embodiments response provider users may provide responses that utilize additional types of content, such as various forms of multimedia content (e.g., images, audio, video, etc.), active content (e.g., implemented by the use of applets, plug-ins, scripts or other executable code), and/or links to or other indications of content (e.g., a URL link, instructions for locating/obtaining the content, access information for use in obtaining access, etc.) provided by one or more sources external to the answer-providing service of the Rapid Answer system. Various technologies may be utilized to provide such functionality, including, but not limited to, JavaScript, Java Applets, Macromedia Flash, ActiveX, and AJAX. Such additional types of content may be used in various ways, including to provide interactive maps, weather reports, traffic conditions, calendars, reservation services (e.g., for restaurants, entertainment, travel, etc.), community-based content (e.g., wikis, online communities, etc.), ranking and other reputation-related services, etc. Such additional types of content may also be generated by a response provider user for a particular response in various ways, including in some embodiments by using a set of standardized tools, modules, and/or development environments that are provided by the Rapid Answer system. For example, in some embodiments the Rapid Answer system may provide multiple content-specific modules that may each be selected and configured by a response provider user to provide a particular piece of content of a particular type as part of a response, such as a map module, a calendar module, a restaurant reservation module, etc. Other embodiments may provide a toolkit and/or API that allows response provider users (and/or third-party developers) to implement and provide custom content modules for use by response provider users and inclusion as part of responses. In some embodiments, facilities for the generation and transfer of licensing fees for custom content modules may also be provided, such as for a third-party developer that provides a custom content module to receive fees from response provider users who use the module (e.g., fees that may be automatically deducted from any fees awarded to such response provider users from use of the module).

The incorporation of various forms of content by response provider users in responses may also give rise to various legal issues, including copyright and trademark, such as based on how and when the content was generated. For example, if a response provider user includes content of one or more defined types (e.g., images, audio or video clips, etc.) as part of a response, the Rapid Answer system may in some embodiments attempt to gain assurance that the response provider user has rights to provide the content. Such assurance may be provided by, for example, an affirmative indication by the response provider user that he/she has the authority to provide the content, by specifying terms and conditions for use of the Rapid Answer system that only authorized content may be provided, by warranties or other guarantees provided by the response provider user, etc. Other embodiments may provide mechanisms by which potential rights-holders can provide notice to response provider users and/or the operators of the Rapid Answer system of potential rights violations, such as to allow unauthorized content to promptly be removed or otherwise handled.

FIG. 2F illustrates an example of a GUI screen or page that displays various details about an account of a response provider user with the Rapid Answer system, including indications of any preferred or otherwise enhanced status of the response provider user (e.g., based on reaching one or more incentive levels related to amount of expertise of the response provider user). In particular, in this example the displayed information includes a navigation section 281 with links to various groups of information, a reward section 283 that includes information about monetary and expertise point rewards earned by the user, a profile section 285 that includes various information about the user, an awards section 287 that indicates enhanced status of the user based on incentive levels reached regarding expertise in several categories, a notification section 291 with which the user can specify criteria regarding types of open questions of interest (e.g., criteria to identify matching questions, including categories and/or keywords, and criteria regarding how/when notification of matching questions is to occur), and a ranking section 289 indicating relative rankings of the user's expertise in various categories. In this example, several enhanced status levels are available, such as labeled "silver" and "gold" in this example, with the higher "gold" level providing all of the benefits of the lower "silver" level in addition to other benefits. For example, by being in the top 25% of level of expertise of response provider users for a particular category, a response provider user may earn "silver" status and receive various benefits (e.g., an extension of a default amount of time of 12 months to 18 months for sharing ongoing revenue streams for answers in which the response provider user participated, an ability to specify and receive notifications when questions become available that match specified criteria, etc.), and by being in the top 10% of level of expertise of response provider users for a particular category a response provider user may earn "gold" status and receive various additional benefits (e.g., an extension of the default amount of time of 12 months to 24 months for sharing ongoing revenue streams for answers in which the response provider user participated, a more sophisticated ability to specify and receive notifications when questions become available that match specified criteria, etc.).

In some embodiments, similar types of information may be displayed for other types of users, such as requester users and/or item provider users. For example, requester users may be provided with information to enable retrieval of questions that the requester user has previously asked or viewed, to view points and/or money spent asking questions, etc., and item provider users may be able to see the amount of money spent to provide their responses and/or answers that include their responses. In addition, if an individual user plays different roles in the system, the user may be able to view all their account information at once or to instead switch between roles as indicated.

FIG. 2G illustrates an example GUI screen or page that allows viewer users to identify answered questions of interest, such as by browsing categories. In particular, in this example the displayed information includes an answer section 295 and a related categories section 293, with the answer section showing various details for each of several question/answer pairs in a "J2EE" category (e.g., the summary of the question, the requester user who supplied the question, and the categories associated with the answer). The answer section may include additional information in other embodiments, such as indications of the response provider users who provided responses used in the answer and/or one or more of various details related to the answer. The related categories section 293 shows categories that are related to the current category, such as may also be of interest to the viewer user and may be determined in various ways in various embodiments (e.g., based on sharing overlapping tags, such as if each category may have multiple associated tags; based on answers and/or other information related to the categories being sufficiently similar, based on the categories being related as part of a hierarchy or other inter-relationship, etc.).

Figure 2H:
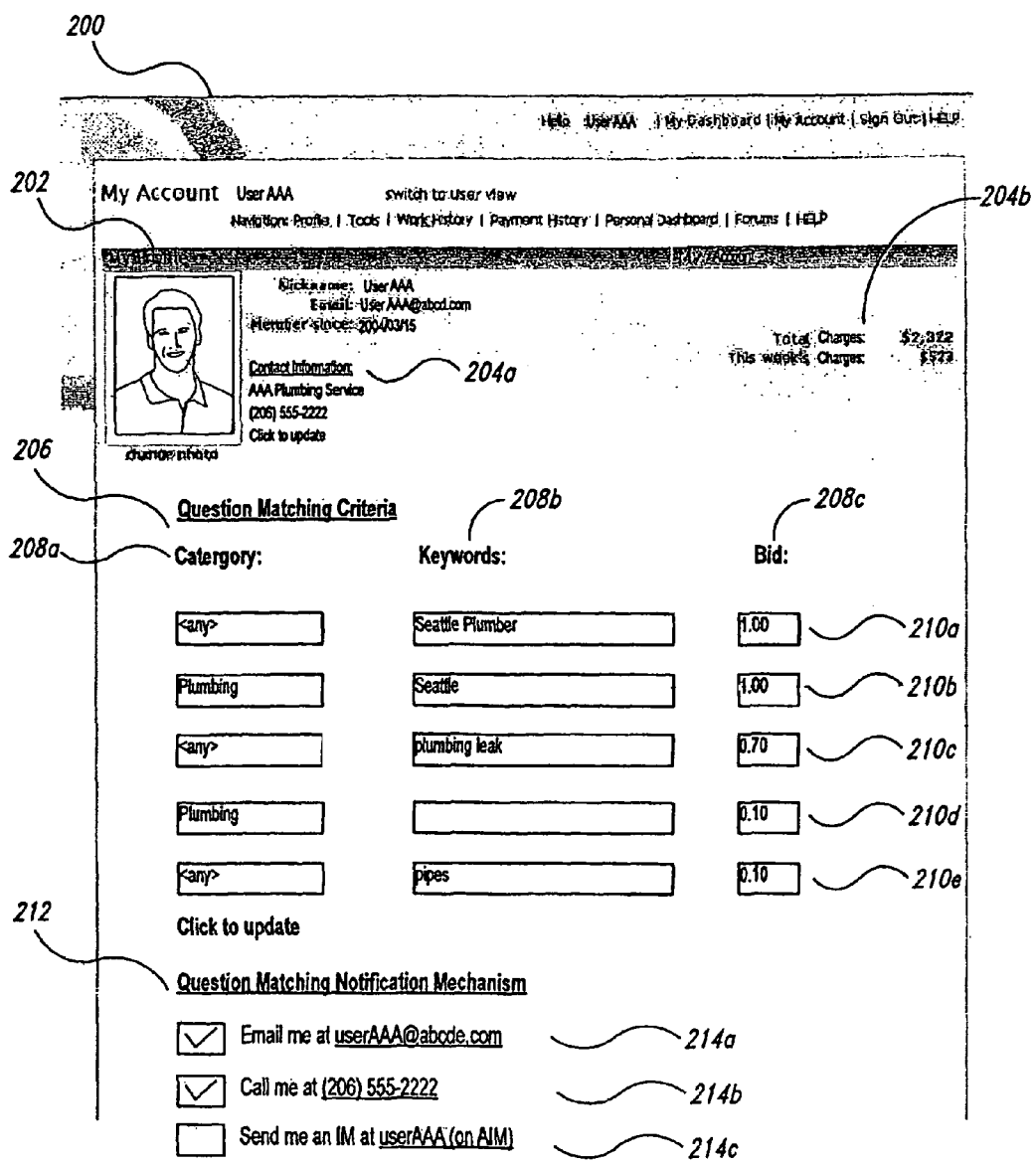
Figure 21:
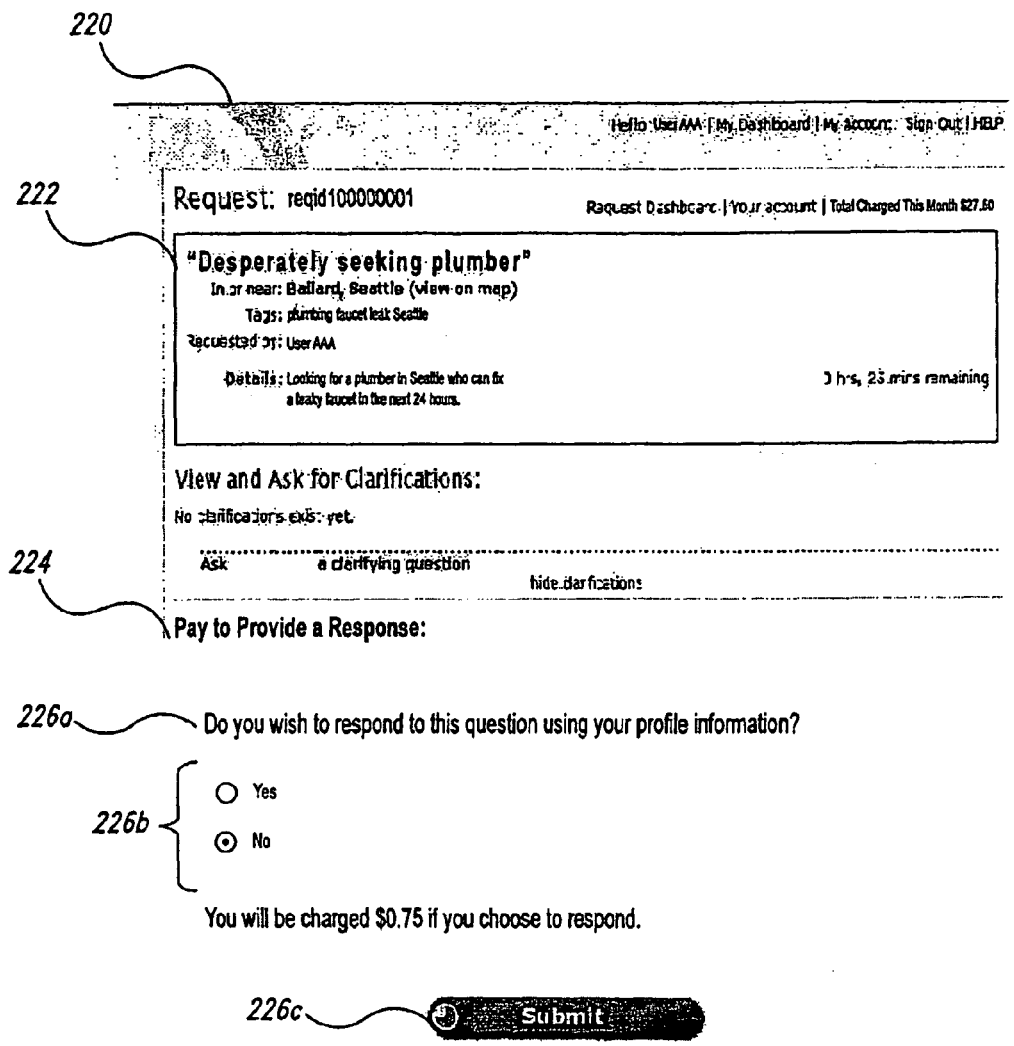

FIG. 2H illustrates an example GUI screen or page 200 that allows an item provider user to specify information related to questions that are of interest and for which the item provider user is willing to pay in order to include information as part of the questions' answers if the item provider user so elects on a per-question basis. In particular, in this example the displayed information includes a profile section 202, a question matching criteria section 206, and a question matching notification mechanism section 212. The profile section 202 includes contact information 204a and payment information 204b in this example. In some embodiments, at least some of the contact information will automatically be provided as part or all of the item provider user's paid response to a question. The billing information 204b displays accumulated charges reflecting the amount of money the item provider user has paid and/or promised to pay for responses that the item provider user has elected to provide to supplied questions.

The question matching criteria section 206 in this example includes multiple groups of question matching criteria 210a-e that each identify a distinct set of questions of interest, with each criteria group including a category field 208a, a keywords field 208b, and a bid field 208c. In this example, the criteria will be used to determine to notify the item provider user of a given question supplied by a requester user if the question matches one of the criteria groups and if the bid is sufficiently high (e.g., is the highest bid of any matching group of criteria of any item provider user, is within the top X highest such bids where X is a predetermined number), although in other embodiments other factors may additionally be used (e.g., whether an item provider user has a preferred or premium status, such as based on past interactions with the Rapid Answer system and/or based on payment for such status; whether the item provider user frequently elects to exercise options of which the user is notified; etc.). In the illustrated embodiment, a given group of criteria matches a question when the category displayed in the category field 208a is identical to the category of the supplied question and all of the keywords displayed in the keywords field 208b appear somewhere in the question text, metadata associated with the question, and/or metadata associated with the requester user who supplied the question (e.g., geographic location, demographic information, etc.). For example, in criteria 210a the item provider user has expressed interest in questions of any category (as illustrated by the use of "<any>") that match the keywords "Seattle" and "plumber". In criteria 210b, the item provider user has expressed interest in questions in the "Plumbing" category that also match the keyword "Seattle." In criteria 210c, the item provider user has expressed interest in questions in any category that match the keywords "plumbing" and "leak". In criteria 210d, the item provider user has expressed interest in questions in the "Plumbing" category. In criteria 210e, the item provider user has expressed interest in questions in any category that match the keyword "pipes".

Various approaches for matching questions with question matching criteria are contemplated. For example, in various embodiments the supplied category and/or keywords may be matched individually and combined in various manners to determine a potential match. Some embodiments may provide a hierarchy of categories (e.g., super-categories containing one or more sub-categories), and determine a category match only when either a category specified by an item provider user is identical to the question category or when the specified category is a super-category of the question category. Such embodiments may elect not to determine a category match when the specified category is a sub-category of the question category, because by specifying a more specialized category, the item provider user may indicate that they are not interested in questions containing generalized subject matter. In addition, various embodiments may employ various techniques when comparing keywords specified by item provider users to the supplied question, such as word stemming, approximate matching, regular expression matching, etc. Furthermore, various approaches to combining multiple keywords, keyword matches, and/or category matches are contemplated, such as by way of various logical operators such as "and", "or", etc. In addition, the various techniques described above may be configurable and/or selectable by the item provider user, such as by providing the item provider user with the ability to specify keywords using regular expression syntax and/or allowing the user to select from various logical operators that should be used to combine various category and keyword matches.

Each of the illustrated criteria 210a-e also includes a bid field 208c. In the illustrated embodiment, the item provider user may utilize the bid field 208c in order to express an amount of money that he/she is willing to pay if he/she elects to provide a response to a question that matches the associated criteria. For example, if a question matches criteria 210b (category "Plumbing" and keywords "Seattle"), the item provider user has expressed that they are willing to pay $0.70 if they choose to provide a response to that question. If, on the other hand, a question matches criteria 210e (any category and keywords "pipes"), the item provider user has expressed that they are willing to pay only $0.10 if they choose to provide a response to that question. The differences in values expressed in the various criteria may reflect the fact that a given item provider user more strongly values more specific matches than more general matches. For example, questions that match criteria 210e may include plumbing-related questions as well as car-related (e.g., "exhaust pipes") and tobacco-related (e.g., "tobacco pipes") questions, and therefore not be as worthwhile for an item provider user in the plumbing business.

The amount of money that a given item provider user indicates that they are willing to pay to provide a response may be utilized in various ways. For example, some embodiments may preferentially notify item provider users who have bid greater amounts of money for given criteria. For example, supposing that multiple item provider users have each bid on criteria that match a given question, some embodiments may elect to only notify some subset of those item provider users based at least in part on the amount of money that each item provider user has respectively bid. The subset of item provider users may be selected in various manners, including but not limited to, selecting the highest bidder; selecting some number of high bidders, where the number is a predetermined number or percentage of the total number of matching bidders; randomly selecting some number of bidders (e.g., with the probability of selecting a given item provider user being weighted by the amount of their bid, such that higher bidders are more likely to be selected); etc. In addition, the amount of money that item provider users are actually charged for providing responses may be based in part on the amount of money they bid for matching criteria. For example, in some embodiments item provider users who provide information for answers will be charged the amount that they bid for the criteria that matched the question, while in other embodiments such item provider users may be charged other amounts of money (e.g., the lowest amount, or the average amount bid by all of the item provider users who match, are notified, or elect to submit information for inclusion in the answer).

The question matching notification mechanism 212 in this example includes multiple selectable notification mechanisms 214a-c, including via email, IM, and phone (e.g., automatically, such as by an IVR, or Interactive Voice Response, system). By specifying and selecting at least one of the notification mechanisms, the item provider user may control how he/she receives notification of a question that has matched at least one of the question matching criteria 210a-e. Additional notification mechanisms are contemplated, including via text messages (e.g., Short Message Service messages sent to mobile telephones), paging, news feeds, etc.

FIG. 2I illustrates an example GUI screen or page 220 that allows an item provider user to select whether he/she wishes to provide a paid response to a particular question supplied by a requester user. A response provided by the item provider user may be included in an answer that may also include one or more responses from various response provider users, as illustrated in FIG. 2K. In this example, the displayed information includes a question section 222 with information about a question that matches criteria previously supplied by the item provider user (although in other embodiments at least some such questions may instead be automatically identified for an item provider user without explicitly supplied criteria in various ways), and a response section 224 with which the item provider user may optionally select to pay to provide information for inclusion in the answer for the question. In this example, the question section 222 includes a question summary ("Desperately seeking plumber"), an indication of geographic area ("Ballard, Seattle"), tags or other category information, an indication of an identity of the requester user, question text details, and an indication of an amount of time remaining in which the item provider user may opt to provide a paid response (which may or may not be the same as the expiration for the question, such as to provide a shorter time as a deadline for the item provider user in order to provide an option to one or more additional item provider users to respond to the question if the initial item provider user(s) decline). The response section 224 provides user interface controls that enable the item provider user to select whether to provide a paid response to the indicated question.

The response section 224 in this example includes a prompt 226a, a user-selectable answer field 226b, and a submit button 226c. In this example, the user is provided with only a limited ability to provide paid response information to be included in the answer for the question, and in particular to respond by providing previously specified profile information for the item provider user. Such profile information may be default contact and/or other information as provided by the item provider user, such as to enable the requester user to contact the item provider user. The response section 224 in this example additionally informs the item provider user that they will be charged $0.75 if they choose to submit a response, such as based on one or more bids as described with reference to FIG. 2H. The item provider user may opt to have their response submitted by selecting the appropriate answer ("Yes") in answer field 226b and by activating the submit button 226c. If the item provider user instead selects the "No" option in the answer field 224 and activates the submit button, or if the item provider user takes no action (e.g., by not activating the submit button in the specified time period), the item provider user will not be charged and their response information will not be included in the answer for the question in at least some embodiments. As previously noted, in at least some embodiments a paid response or other information provided by such an item provider user for paid inclusion in the answer for a question may be accompanied by multiple other paid responses from other item provider users and/or may be accompanied by multiple non-paid responses from one or more response provider users.

Figure 2J:
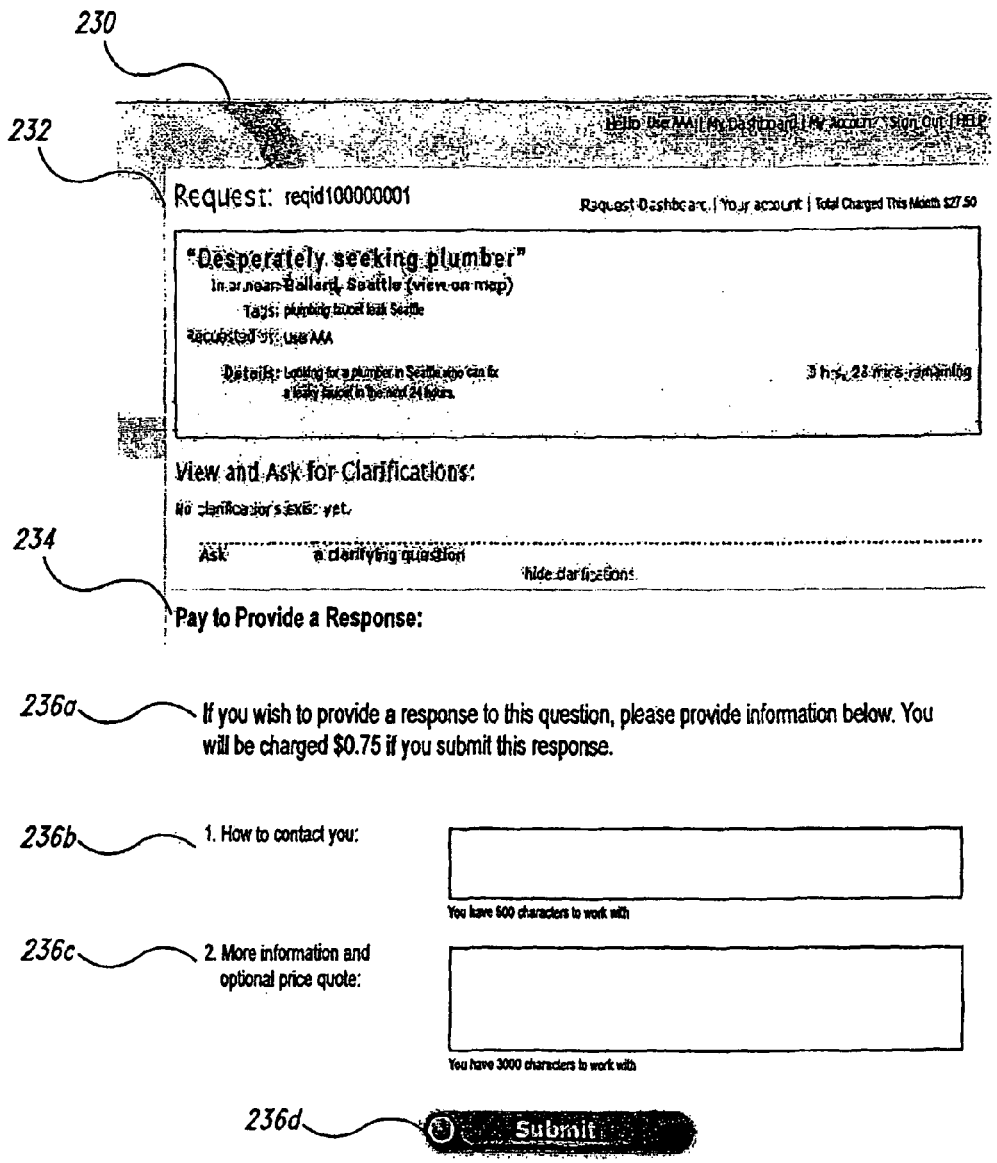

FIG. 2J illustrates an alternative example GUI screen or page 230 that may be provided in order to enable an item provider user to provide a more detailed paid response to a question supplied by a requester user if the item provider user so elects. In particular, in this example the displayed information includes a question section 232 and a response section 234, but the response section allows the item provider user to specify various details for inclusion in the answer to the question if the item provider user so elects. The response section 234 includes a prompt 236a, a contact information field 236b, an information field 236c, and a submit button 236d. If the item provider user chooses to provide a response, he/she may provide his/her contact information in the contact information field 236b, as well as provide other information in the information field 236c. Other information may include other details related to the good or service indicated by the question (e.g., price quotes, warranty information, additional charges, schedule information, hours of operation, disclaimers, etc.). If the item provider user activates the submit button 236d, the information entered into the contact information field 236b and the information field 236c will be provided as part of an answer to the supplied question, and the item provider user will be charged $0.75. If the item provider user does not activate the submit button 236d, or if the item provider activates the submit button 236d after the time period specified in the question section 232, the user will not be charged any fee and any submitted information will not be provided as part of an answer to the supplied question.

Other embodiments may utilize alternative mechanisms for enabling the provision of paid answers to questions submitted by requester users. For example, some embodiments may enable item provider users to store various pre-configured responses and then select from those responses at the time when the item provider user responds to the notification. Such pre-configured responses may include text, audio, images, multimedia, active content, and other forms of content that specify addresses, advertisements, URLs, price quotes, etc. Various embodiments may further elect to handle responses provided after an indicated time period for submitting responses in various ways, such as to simply discard such responses and not charge the item provider user, or to provide such responses as part of an answer that may be viewed by later viewers. Such embodiments may perform such elections interactively, such as by informing the item provider user that they have submitted a response after the indicated time period for responses, but that they may elect to have their response included for later viewers for a price (e.g., a price that reflects a discount of the price that would be ordinarily have been charged to that item provider user to submit a response).

In a manner similar to FIG. 2C, FIG. 2K illustrates an example GUI screen or page 240 that may display a portion of the answer to a question, such as to the requester user who submitted the question, but in this example the displayed information includes a paid response provided by an item provider user. In particular, in this example the displayed information includes a question section 242, a summary section 244, and responses 252. The question section 242 provides details related to the question submitted by a requester user, with the example question in this case requesting information related to purchasing digital cameras. The summary section 244 indicates that three agents have provided a total of 10 responses so far, and that a single camera merchant has provided a paid response. The example responses 252 include a paid response 246 from an item provider user and a portion of a response provider user response 250. The example paid response 246 illustrates an example of information about a particular camera merchant, including current availability (e.g., 11 Popular Brand Model XYZ Digital cameras in stock) and price (e.g., that they are available for $199.95 each as of a given date). The answer is otherwise similar to that described in more detail with reference to FIG. 2C.

Other embodiments may display multiple responses from item provider users to a supplied question in various ways. For example, some embodiments will order such responses based on the amount that each item provider user bid for the criteria used to initially match the question, such that responses provided by item provider users who bid higher amounts of money will be listed prior to, or more prominently than (e.g., using different font sizes and/or colors), responses provided by item provider users who bid lower amounts of money. In some embodiments, only the response provided by the highest paying item provider user may be displayed by default, and other responses may optionally be displayed only if the requester user or other user viewing the answer indicates that they wish to view such other responses (e.g., by clicking a link or activating some other user-selectable control that enables the user to access or otherwise view such other responses).

In addition, in some embodiments a variety of additional types of functionality may be provided by the Rapid Answer system via one or more such GUI screens or pages. For example, in addition to providing feedback on particular responses that are supplied as part of the answer for a submitted question, the requester user who supplied the question may further provide various types of feedback related to the response provider users who submitted the responses (e.g., to indicate a response provider user who is particularly helpful and/or unhelpful, such as based on the provided responses and/or on clarifications or other interactions with the response provider user) and/or related to one or more item provider users who submitted paid responses or to those paid responses (e.g., to indicate unhelpful or abusive paid responses, such as for use by the Rapid Answer system in restricting or preventing future such paid responses from the item provider user). Similarly, response provider users may also provide various types of feedback regarding a question for which the response provider user is participating in providing one or more responses, such as to indicate particular responses that are supplied by other response provider users for the submitted question as being helpful (e.g., the best answer) and/or unhelpful (e.g., lame or abusive), and to provide feedback regarding tags or other category information submitted by other response provider users and/or the requester user (e.g., to indicate the best tag or category, or to indicate unhelpful or abusive tags or categories). In addition, in some embodiments users other than a requester user who submitted a question and the response provider users who provide responses for the question may be able to provide similar types of feedback for the question, such as for viewer users and/or item provider users to supply tags and other categories and/or to provide feedback regarding others' tags, categories, responses, and participation. Moreover, in some embodiments users may be able to specify various security and/or privacy preferences and other information, such as to prevent a requester user's location information from being displayed unless it is relevant to the question, or to prevent usernames or other identity information of users to be provided to others.

In addition, while examples of various interactions by various users with the Rapid Answer system have been illustrated using a GUI provided by the Rapid Answer system, these and other related types of interactions may be performed in various other manners in other embodiments. For example, submission of questions, submission of responses, and other types of interactions may be programmatically provided to the Rapid Answer system via one or more APIs provided by the Rapid Answer system in some embodiments, such as via one or more Web services provided by the Rapid Answer system. Alternatively, in some embodiments some or all such types of interactions by various users with the Rapid Answer system may instead be performed using a messaging interface based on email or other types of electronic messages, or in other manners (e.g., based on an automated voice-based message system, such as via phone messages). Moreover, in some embodiments multiple modes of interaction may be used by a particular user with respect to a particular question, such as to submit a question via email and to receive responses for the answer using one or more other modes of communication (e.g., via an automated phone call, via an IM or SMS message, by interacting with the Rapid Answer system via a GUI or in a programmatic manner, etc.). In embodiments that utilize IM to receive questions and responses and to provide answers, the Rapid Answer system may have an IM identity indicated by a handle or username (e.g., "RapidAnswers") that users may add to a contact list (e.g., a buddy list) for purposes of sending and receiving instant messages to and from the Rapid Answer system that contain questions, responses, and/or answers.

FIGS. 2L-2R illustrate examples of various interactions between participants using an example messaging interface to the Rapid Answer system that is based on email communications. In particular, in this example the Rapid Answer system provides one or more email addresses (or other electronic message addresses) to which requester users can submit questions, and answers to the questions can be returned to the requester users at the account from which a question was submitted and/or to another designated account. Submitted questions may then be provided to response provider users and/or item provider users in various ways, and corresponding responses may be received from those users in various ways, such as via a GUI as previously described in FIGS. 2A-2K, or instead based on email messages or another type of messaging interface.

In particular, FIG. 2L illustrates an example email message 291 that an example requester user UserABC has sent to submit a question to the Rapid Answer system, such as to an email address provided by the Rapid Answer system for receiving such questions (in this example, "ask@rapid-answer.com"). In this example, the question is specified as part of the subject line 291*d* of the email, such as to request information about Italian restaurants in Boston, and other information related to the question is not specified (e.g., tags or other categories, other metadata related to the question, etc.). FIG. 2M illustrates an alternative example email message that requester user UserABC has sent to submit a question to the Rapid Answer system, but in this example the email message body includes information 291*e*-291*g* to specify additional related information, such as tags or other category information, a geographic location associated with the question, and information about a reward offered by UserABC for providing an answer for the question. In other embodiments, such question-specific rewards designated by requester users may not be used, such as if each requester user is instead charged the same amount to submit a question (e.g., ten cents) and/or if the same number of experience points is provided as a reward for each such submitted question. Additional information, such as tag and/or category information, reward information, etc., is identified in the illustrated email by preceding the information with a textual indicator to identify the type of the subsequent information (e.g., by using "tags:" to indicate the specified tags), but can be specified in other manners in other embodiments. For example, FIG. 2N illustrates an example in line 291*h* in which a character-based indicator is instead used to identify tag information that is being supplied (in this example, an at sign "@"). In other embodiments, various types of information about a question being submitted may instead be submitted in other manners, such as by including the question text in the body of the email, submitting the question via multiple related emails, etc.

FIG. 2O illustrates several responses supplied back to UserABC for the supplied question, with the responses each sent in a separate email message in this example. For example, a first response email 292 is sent to include a phone number of a particular restaurant this is supplied by response provider user UserDEF, with the text of the response included in the subject line 292*d* in this example. As is shown, in this example the response email is sent from the Rapid Answer system rather than directly from the response provider user, with the response information potentially having been supplied to the Rapid Answer system by response provider user UserDEF via a GUI of the Rapid Answer system. Example response email 293 from response provider user UserGHI includes an opinion response, with summary information shown in the subject line 293*d* and with additional information 293*e* included in the email message body. Example response email 294 includes a second response from response provider user UserDEF, which in this example includes a Web site URL. Various other types of response information may be provided in other manners in other embodiments, such as by providing multiple responses from a single response provider user or from all response provider users together in a single response email message, and by specifying the actual response information in various other ways.

In addition, in this example the Rapid Answer system further automatically includes additional information in the response emails sent to UserABC, which in this example are tracking identifiers shown in lines 292*e*, 293*f*, and 294*e* of the response emails that are unique to the submitted question. In this example, the tracking identifiers are related but each distinct (e.g., by including a common base identifier "2341973293" followed by a suffix identifier specific to each response email), but in other embodiments may instead be related in other manners, identical for all of the response emails for a particular question, or unrelated to each other (e.g., by each being randomly generated and associated with the corresponding response email). The tracking identifiers are provided in this example to provide additional security with respect to some types of actions taken by requester users. For example, while UserABC was able in this example to supply a question without including a tracking identifier or other information for use in verifying the authenticity of the email with which the question is submitted (e.g., a password or other identifying information for UserABC), at least some other types of interactions in this example by UserABC may require additional verification, such as by including a tracking identifier from an email supplied for the question to which the interaction is related (e.g., to provide feedback regarding the responses and/or response provider users) or from any email (e.g., to provide a command to the Rapid Answer system related to the account of UserABC that is not specific to the submitted question). By including a tracking identifier from a prior email sent to the requester user from the Rapid Answer system, additional security is provided in that a malicious user without access to such prior emails cannot send effective emails to the Rapid Answer system on behalf of UserABC.

FIG. 2P illustrates multiple examples of using such tracking information when the requester user UserABC provides additional messages, such as for feedback and other commands. For example, FIG. 2P includes an alternative embodiment of previously discussed response email 292, which in this example includes information and user-selectable controls 292*f* in the body of the email to allow the requester user to provide feedback related to the response (e.g., controls that are links to be displayed in an HTML-based email viewer). Example email 295 then demonstrates a feedback email that may be generated and sent to the Rapid Answer system if the requester user UserABC selects the "Unhelpful" feedback control in the response email 292, such as in an automatic manner without further interaction or input by UserABC. In this example, the generated email is sent to a different email address of the Rapid Answer system (e.g., "feedback@rapid-answer.com"), and the actual feedback and a tracking identifier that is related to (e.g., based on) the tracking identifier from the response email 292 are included in the subject line of the feedback email. In other embodiments, the feedback email may contain other types of information and/or be specified in another manner (e.g., the tracking identifier included in the feedback email may instead be identical to the tracking identifier in the response email 292, or may be unrelated, such as if the included tracking identifier was previously generated by the Rapid Answer system and associated with the "Unhelpful" control in the response email 292 that was sent to the requester user).

Example feedback email 296 provides an alternative example of a feedback email from requester user UserABC related to prior response email 294, and in particular illustrates an example of a feedback email that is generated by UserABC without use of any special feedback-related controls provided to UserABC. Instead, in this example UserABC provides feedback related to the response email 294 by using email reply capabilities, with the response email 294 included in the reply feedback email in typical fashion (including the tracking identifier that was present in response email 294), with the reply email being returned to the sender of the response email 294 (which in this example was indicated to be the same "ask@rapid-answer.com" email address, although in other embodiments a distinct response email address could be used for each of some or all of the response emails, such as "response@rapid-answer.com"), and with the "Unhelpful" feedback being manually input by UserABC in line 296*e* of the body of the feedback email. In other embodiments, tracking identifiers and/or other tracking functionality may be used in other manners, and while the tracking identifiers are labeled in this example, in other embodiments the tracking identifiers may not be labeled and/or may be otherwise obfuscated in order to prevent identification of the information by malicious users. Such obfuscation may be accomplished in various ways, such as by being placed into email message headers that are typically not displayed by email clients, by being located in non-displayable portions of a rich-text message body (e.g., as a comment in an HTML-formatted message body), by being embedded or otherwise encoded in binary message content (e.g., as a comment field or watermark in binary image data), etc.

FIG. 2Q illustrates an example of a command email that is supplied by UserABC to the Rapid Answer system in such a manner as to use a tracking identifier from an email previously sent to UserABC by the Rapid Answer system, but with the prior email being unrelated to the current command. In particular, in this example each question submission by UserABC is paid for by UserABC based on previously purchased question credits or points, and UserABC desires to pre-purchase credits for use in submitting ten additional questions. Accordingly, UserABC in this example selects any email that was previously sent to UserABC by the Rapid Answer system (or in other embodiments any such previously sent email that meets specified criteria, such as within a certain amount of time and/or of a certain type), and generates a reply email to the Rapid Answer system that includes a desired command (e.g., one of a predefined set of commands that were previously provided to UserABC, such as when UserABC initially registered with the Rapid Answer system and/or configured use of the messaging-based interface). In this example, UserABC generates a command email message 297 by replying to prior response email 294, and includes the command "Buy 10" in line 297*e* of the body of the reply mail to indicate that ten additional question credits are to be pre-purchased (e.g., using previously specified payment information from UserABC's account). When the Rapid Answer system receives the command email, the system verifies that the command email includes a tracking identifier from an email that the Rapid Answer system previously provided to UserABC, and may further perform additional checking to determine whether to authorize the indicated action (e.g., by reviewing previously specified preferences or other configuration information for UserABC, by reviewing a current status of UserABC's account and whether any money is owed or other problems exist, etc.). In this example, the Rapid Answer system determines to grant the command, but only if UserABC supplies additional confirmation to ensure that the received command email was actually from UserABC (e.g., for some or all types of command messages). Accordingly, the Rapid Answer system generates and sends confirmation request email 298 that requests in subject line 298*d* that UserABC reply to confirm the command. In the illustrated example, the confirmation request email 298 includes a new tracking identifier in line 298*e* that is related to but distinct from the tracking identifier used with UserABC's command email 297 (e.g., by sharing the first six digits, but with the subsequent four digits being randomly generated). In this example, after UserABC receives the confirmation request email, UserABC replies with confirmation email 299 that includes the command "Confirm" in line 299*e* of the email message body. Upon receipt of the confirmation email (and optionally upon verification that the reply email includes the tracking identifier from the confirmation request email), the Rapid Answer system performs the command by obtaining payment from UserABC for the ten additional question credits and by associating those prepaid credits with UserABC's account. It will be appreciated that a variety of other types of commands can be supplied, including to reflect any action that a requester user could take by instead interacting with a GUI and/or programmatic interface of the Rapid Answer system, and that various types of command information may instead be specified in other manners in other embodiments (e.g., using XML or other types of data formatting). Additional details regarding other examples of commands are described below. In addition, while examples of use of a messaging-based interface have been shown for only requester users, it will be appreciated that in at least some embodiments any user (including response provider users, item provider users and viewer users) could use such a messaging-based interface with appropriate types of messages.

FIG. 2R illustrates two additional example types of messages that may be used with the messaging-based interface, although a variety of other types of messages may be used in other embodiments. In this example, message 281 represents a clarification message to requester user UserABC to reflect a clarification request from a potential or actual response provider user regarding the question previously submitted by UserABC—in particular, in this example the clarification question is included in the subject line 281*d*, but could instead be specified in other manners. While not illustrated, UserABC could then provide clarification information by replying to the clarification request email in a manner to that previously discussed for other types of reply emails. In addition, example email message 282 represents a paid response to the question previously submitted by UserABC. More specifically, in the illustrated example, a representative of item provider Restaurant RRR has elected to provide a response to UserABC's question (e.g., after receiving and reviewing the question) in exchange for payment from Restaurant RRR. Accordingly, the subject line 282*d* in this example includes information specified by the Restaurant RRR representative for use in this response. While the response is indicated in this example as being a paid response, in other embodiments such paid responses or other paid information from item provider users may not be explicitly identified as being distinct from responses from response provider users.

Thus, the Rapid Answer system may perform various types of interactions with various types of users. Additional details related to one example system for interacting with users to supply tasks to be done and to receive corresponding results are included in U.S. patent application Ser. No. 10/990,949, filed Nov. 16, 2004 and entitled "Providing An Electronic Marketplace To Facilitate Human Performance Of Programmatically Submitted Tasks," which is hereby incorporated by reference in its entirety.

As previously noted, a response provider user may receive payment or other compensation from the Rapid Answer system at various times, such as for a response for a particular question that has a monetary reward and/or as part of sharing a portion of an ongoing revenue stream associated with one or more answers to which the response provider user contributed. In some embodiments, such monetary rewards are associated with an account of the response provider user at the Rapid Answer system, and the response provider user may access the account (e.g., at designated times or in designated situations, such as once the accumulated earnings have reached a minimum threshold or no more often than a designated access frequency, or instead at any time) in order to obtain access their accumulated earnings (e.g., to be used as part of an ecommerce transaction, to be obtained as cash, etc.). In other embodiments, earnings may be automatically provided to response provider users in other manners (e.g., periodically, such as monthly), such as by a payment component that is part of the Rapid Answer system or instead based on interactions between the Rapid Answer system and one or more third-party payment systems. In addition, other types of users may similarly receive and/or make payments in some embodiments and situations, such as by interacting with such a payment component of the Rapid Answer system or instead based on interactions with one or more third-party payment systems. Additional details related to example systems for making payments and for tracking related information for users are included in U.S. patent application Ser. No. 10/894,350, filed Jul. 19, 2004 and entitled "Performing Automatically Authorized Programmatic Transactions," and in U.S. patent application Ser. No. 11/200,880, filed Aug. 9, 2005 and entitled "Performing Providing Payments Automatically In Accordance With Predefined Instructions," each of which is hereby incorporated by reference in its entirety.

In some embodiments, rewards may be allocated to response provider users who provide responses to questions of other requester users, and FIGS. 3A-3C illustrate examples of allocations of such rewards. In particular, FIG. 3A shows an example of a reward allocation for responses to a question to which 100 experience points have been allocated for the question's answer. In the table, there are columns for responses 301, response provider user 1 303, response provider user 2 305, response provider user 3 307, response provider user 4 309, response provider user 5 311, and total points 313. Rows 315a-e each represent an individual unique response. Although the number of responses equals the number of response provider users in this example, the numbers are exemplary, and in other situations there may be differing numbers of responses and response provider users.

Since there were 5 unique responses and 100 points for the question in this example, each unique response is allocated an equal number of 20 points. Once the points for each response are determined, the points may be allocated to response provider users by dividing the number of points by the number of response provider users that gave the response. Thus, for Link A 315a, since the points for Link A is 20 points and 4 response provider users gave the response, each response provider user gets 5 points (20 points/4 response provider users). The process is repeated for all remaining responses, and the results are shown in rows 315b-e. In addition, some types of responses may be considered to be inherently unique, such as if all opinions are considered unique. Thus, if multiple response provider users provide an opinion, each opinion may count as a separate response. In addition, some types of responses (e.g., phone numbers) may be unique if the system will not accept an additional response that is a duplicate. Totals 317 for the response provider users may be calculated by adding the number of points within each response provider user's column (i.e., for all the responses supplied by the response provider user). Thus, response provider user 1 303 receives a total of 15 experience points (5 for Link A and 10 for Link B) for his/her responses to this question. These assessed experience points that are newly allocated to a response provider user may then be combined with any prior experience points or other related information for a user in order to determine a current assessed experience score, such as by adding the newly allocated experience points or otherwise combining the new and existing experience points (e.g., in a weighted manner, such as to give greater weight to recent experience points or to historical experience points).

In other embodiments, other algorithms may be employed to allocate experience points to responses and/or to response provider users. In some embodiments, various factors other than uniqueness of responses may be used to allocate points to responses, including the quality of responses (e.g., as measured by feedback from a requester user who supplied the corresponding question and/or by feedback from other response provider users who provided responses for the question) and/or timeliness of the received responses (e.g., to provide more points for rapidly provided responses and/or for responses provided by an indicated deadline). In addition, rather than allocating a fixed number of experience points for an answer, in some embodiments each response and/or response provider user may be allocated a variable number of experience points based on a metric such as quality and/or timeliness, each of which may be measured in various ways in various embodiments. For example, quality may be measured based on feedback received from one or more users and/or in an automatically assessed manner, such as based on a comparison to other responses (such as responses known or believed to be of particular levels of quality) and/or other factors such as a completeness or other objectively measurable aspect of the response, and timeliness may similarly be measured based on feedback received from one or more users and/or in an automatically assessed manner. As one example, each response may be allocated 20 experience points if given the highest rating, 10 experience points if given a good rating, 5 experience points if given an acceptable rating or if not explicitly rated, −10 experience points if given a lame or otherwise unhelpful rating, and −20 experience points if given an abusive rating. As another example, a response provider user who first provided a response may be favored and given more points (e.g., ½ of the points for the response), such as for embodiments that allow response provider users to see responses from other response provider users. In some embodiments, if a question is associated with multiple categories, then the experience points given may be divided by the number of categories to award experience points for each category. Thus, for a two-category question, the response provider user 1 would receive 7.5 points for each category. In other embodiments, the experience points for each response are not divided for each category, and the same number of experience points for the response are awarded for each category. In some embodiments, points are rounded to the nearest whole point; while in others, fractional experience points may be awarded.

FIG. 3B shows an example of an experience point reward allocation similar to that shown in FIG. 3A, but with the allocation being modified to reflect requester user feedback regarding a lame answer response. The question is the same 100-point question from FIG. 3A, but in this example the requester user who asked the question has identified the Link A response as being lame. Similar to the table in FIG. 3A, there are columns for responses 331, response provider user 1 333, response provider user 2 335, response provider user 3 337, response provider user 4 339, response provider user 5 341, and total points 343. The rows 335a-e each similarly represent responses, and row 337 represents the total number of points for the response provider user. Since the Link A response was marked lame, it is not identified as a response to be used in the answer, and points are reallocated among the four responses in the answer in a manner similar to that previously described with respect to FIG. 3A. Thus, each remaining response is now worth 25 points (100 points/4 responses), and points are split among the response provider users who gave the same response. In addition, the response provider users who supplied the lame response also have a predetermined number of experience points (e.g., 10 points) taken away as a penalty in this example.

FIG. 3C shows an example of an experience point reward allocation similar to that shown in FIG. 3A, but with the allocation being modified to reflect requester user feedback regarding an abusive answer response. The question is the same 100-point question from FIG. 3A, but in this example the requester user who asked the question has identified the Link C response as being abusive. Similar to the table in FIG. 3A, there are columns for responses 351, response provider user 1 353, response provider user 2 355, response provider user 3 357, response provider user 4 359, response provider user 5 361, and total points 363. The rows 355a-e similarly each represent responses, and row 357 represents the total number of points for the response provider user. As a result of Link C being marked as abusive, both the Link C response and any other response provided by response provider users who supplied Link C as a response are removed from the answer, and the experience points are reallocated among the remaining answers in a manner similar to that previously described with respect to FIG. 3A. Since there are now only 3 valid responses (since Link C is removed as abusive and the opinion is removed because response provider user 3 also supplied the abusive response), each response is worth 33 points, and rows 355a-c reflect the number of experience points allocated for each response provider user for each response. In addition to not earning any points for the question, the response provider user(s) who provided the abusive response may also have a predetermined number of points taken away as a penalty; in this example, the predetermined number of points is 50 points. Row 357 shows the total number of points for each of the response provider users after the reallocation.

In other embodiments, penalties and award allocation may be performed in different manners and the illustrated examples are merely exemplary. Thus, in some embodiments, if a response is marked as abusive, only the abusive answer may be removed and result in a penalty, and the response provider user's other responses may still result in experience points. In some embodiments, the requester user may identify multiple responses as lame and/or abusive. In some embodiments, the predetermined number of experience points taken away as a penalty may escalate based on the number of lame or abusive responses received from a user within a period of time, such as a rolling time period or a fixed time period. In some embodiments, various information may further be displayed such as the percentage of responses marked as lame and/or abusive. In some embodiments, response provider users may also identify responses of other response provider users as lame or abusive, and in some embodiments item provider users' responses may also be marked as lame and/or abusive. Furthermore, in some embodiments, response provider users may be penalized in manners other than a reduction in experience points, such as by temporarily or permanently banning such users from receiving questions, providing answers, or undertaking other actions.

In addition, in some embodiments, experience points may be utilized to incentivize or otherwise control the activity of item provider users. For example, item provider users may be awarded experience points based on positive feedback obtained from requester users and/or other users of the Rapid Answer system. Such feedback may be based on the usefulness of responses (e.g., accuracy and/or responsiveness of information provided) and/or evaluations of goods and/or services provided by an item provider user (e.g., quality of provided service, promptness of delivery of provided goods, value of provided goods, etc.). In addition, item provider users may be incentivized to obtain successively higher levels of expertise (e.g., as measured by an accumulation of experience points) by providing additional benefits to item provider users with advanced expertise levels. Such benefits may include favorable payment terms (e.g., discounts on the amount of money an item provider pays to provide a response, longer periods of time for account payment, etc.), increased access to questions that are more likely to be valuable to item provider users (e.g., requests for information for expensive goods and/or services), etc. In addition, penalties may be utilized to provide disincentives for item provider users to undertake undesirable activities. Such undesirable activities may include, for example, submitting responses that are not unhelpful or otherwise irrelevant (e.g., advertisements or solicitations for goods and/or services not related to those indicated by the question), providing nonconforming goods and/or services (e.g., defective goods, poor quality service, slow delivery, failure to honor warranties, etc.), etc. Such penalties may be based on a reduction of accumulated experience points for an item provider user, such that a penalized item provider user may lose an enhanced status that was based on accumulation of experience points. In addition, other penalty mechanisms may be used, such as temporary or permanent prohibitions of particular actions of a penalized item provider user (e.g., bans on providing any responses or providing responses to certain categories of questions, etc).

FIGS. 4A-4B illustrate examples of determining portions of an ongoing revenue stream for an answer to be shared with users who provide responses that are part of the answer. In particular, FIG. 4A shows one embodiment of determining the revenue stream share portions for a question whose answer has been determined, with the answer in this example having a single associated category (not shown). The table in FIG. 4A has columns 401, 403, 405, 407, and 409 representing the five response provider users who provided a response, and column 411 representing a total. The number of response provider users is only exemplary, and more or fewer response provider users may have answered any individual question. In order to determine the percentage of the revenue share between the response provider users, the relative ranking of the response provider users for the category associated with the answer to the question may be determined based on the experience points earned for the category. Row 413 illustrates the current experience score of each user in the category associated with the answer (represented here by the raw number of total experience points for the user in the category), and the relative ranking for the users based on those experience points is shown in row 415 (in this example, the response provider user with the highest number of experience points in the category receives the highest relative ranking of 5, since there are five response provider users, while the response provider user with the lowest ranking receives the relative rank of 1). The percentage of the revenue share portion is then determined in this example for each response provider user in a manner weighted by the relative ranking of the user—in particular, the total of the relative rankings in this example is 15 (the sum of 1+2+3+4+5), and the percentage is determined by dividing the relative ranking by the total ranking. The result is shown in row 417 for each of the response provider users.

In other embodiments, different allocation algorithms may be utilized. For example, response provider users who provided a response marked lame or abusive may not receive a revenue share for the answer in some embodiments. In some embodiments, response provider users who only provided a lame response may instead have their revenue share percentage adjusted downward, while the response provider user who provided the best response may receive the portion of the revenue taken away from the response provider user that provided the lame response. If multiple categories were associated with the answer, the revenue stream determination may first determine the amount of revenue for each category (e.g., by dividing the total revenue stream portion by the number of categories), and then perform a relative ranking based on each category.

FIG. 4B shows an example of a revenue stream share determination similar to that shown in FIG. 4A, but with the determination occurring at a later time during an extended revenue share time period of the answer, such that users who lack an enhanced incentive level status are no longer receiving a portion of the revenue stream share during the extended period. The question is the same question as shown in FIG. 4A. The table in FIG. 4B, similar to FIG. 4A, has columns 421, 423, 425, 427, 429, 431 representing the five response provider users that provided a response and a total, respectively. However, at this later point in time the number of experience points of the response provider users may have changed, such as based on the response provider users having answered additional questions and received additional experience points. Once again, the users are relatively ranked for each category based on the number of experience points for this category and the percents calculated, but response provider user 1 has now overtaken response provider user 3 in the relative rankings. Row 433 shows the current experience scores for the response provider users based on cumulative experience points, and row 435 shows the current relative ranking of the response provider users. However, if the response provider user does not have an enhanced status, then the percent actually earned becomes zero. Therefore, only one response provider user receives a percentage payout for this category, as shown in the percentage of revenue payout row 437, and the remaining revenue is in this example retained by the Rapid Answer system.

Preferred or other enhanced status may also change over time, resulting in the gain or loss of the additional time for revenue sharing. In some embodiments, once the revenue share is lost, it may be lost forever and subsequently obtaining an enhanced status may not restore it. In other embodiments, if a response provider user achieves an enhanced status, he/she is eligible for revenue sharing during an extended period even for responses previously provided when the response provider user did not have the enhanced status and even for answers that entered the extended period when the response provider user did not have the enhanced status. However, after some period of time, even users with enhanced status may not receive ongoing payments.

Figure 5:
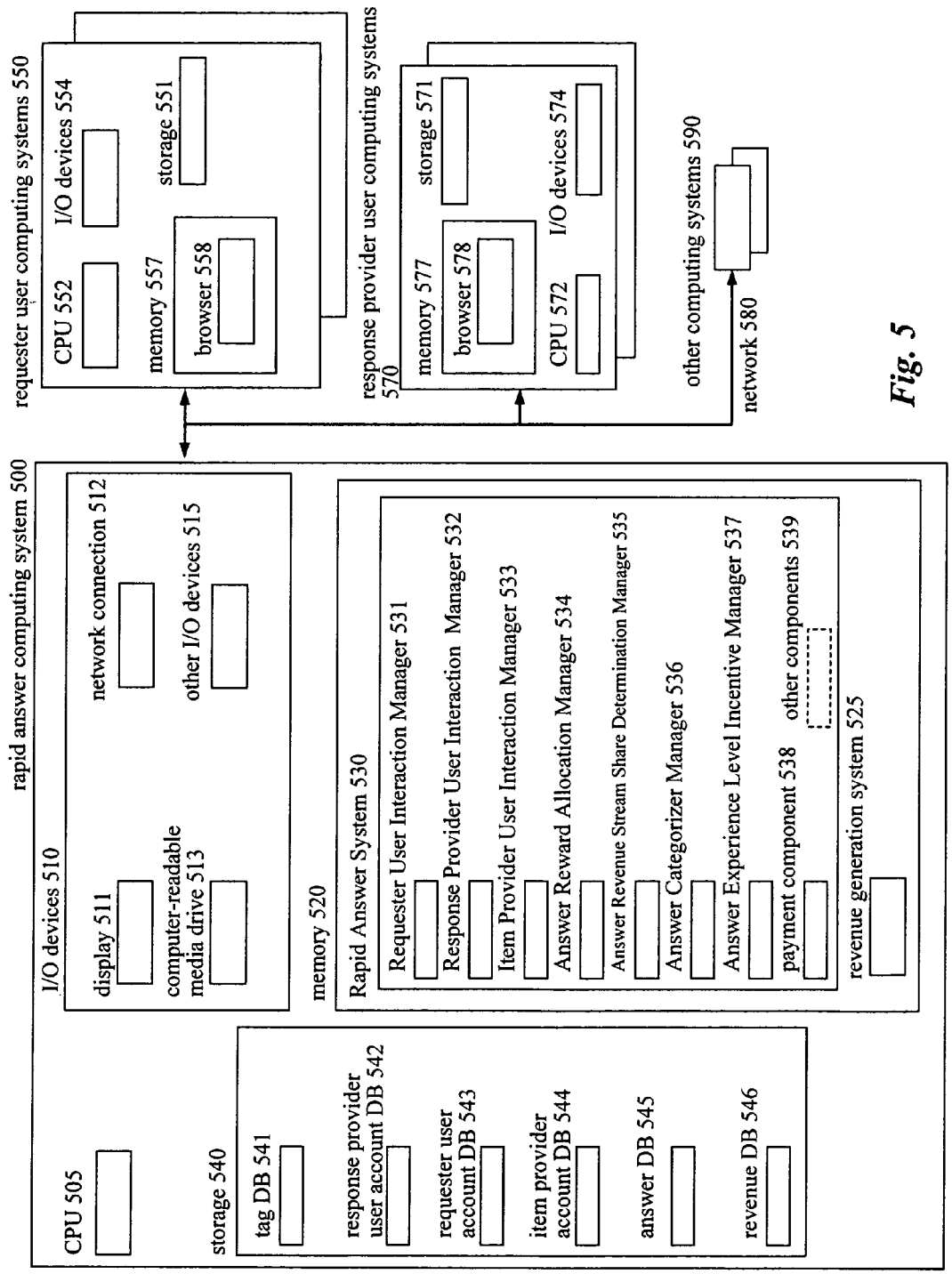
FIG. 5 is a block diagram illustrating a computing system suitable for executing an embodiment of a described Rapid Answer system for providing information of interest to users.

FIG. 5 is a block diagram illustrating a rapid answer computing system 500 suitable for executing an embodiment of a described Rapid Answer system, as well as various requester user computing systems, response provider user computing systems, and other computing systems for performing various interactions with the Rapid Answer system. In the illustrated embodiment, the rapid answer computing system 500 includes a CPU 505, various I/O devices 510, storage 540, and memory 520. The various I/O devices 510 may include a display 511, a network interface 512, a computer-readable media drive 513, and other I/O devices 515.

In the illustrated embodiment, a Rapid Answer system 530 and a revenue generation system 525 are executing in the memory 520 of the rapid answer computing system 500. The Rapid Answer system 530 interacts with other computing systems via the network 580 (e.g., via the Internet and/or the World Wide Web) in order to perform at least some of the described techniques. The Rapid Answer system 530 includes a Requester User Interaction Manager component 531, a Response Provider User Interaction Manager component 532, an Item Provider User Interaction Manager component 533, an Answer Reward Allocation Manager component 534, an Answer Revenue Stream Share Determination Manager component 535, an Answer Categorization Manager component 536, an Answer Experience Level Incentive Manager component 537, a payment component 538, and optional other components 539. In other embodiments, the components may instead be organized in other manners. The Answer Reward Allocation Manager component 534, the Answer Revenue Stream Share Determination Manager component 535, the Answer Categorization Manager component 536, the Answer Experience Level Incentive Manager component 537 may be used internally and various security measures may prevent external access to these components. In addition, in the illustrated embodiment a variety of data structures (e.g., databases) 541, 542, 543, 544, 545 are present in the storage 540 for use by the Rapid Answer system 530 and the revenue generation system 525, although in other embodiments some or all such databases may instead be located elsewhere and/or organized in other manners.

The revenue generation system 525 interacts with multiple advertisers computer systems to generate revenue and store details about the revenue generated. Revenue details may be stored in the revenue database 546 data structure. In those embodiments that determine or estimate the revenue generated for each question, the revenue generation system may also keep track of the revenue generated for the question or the factors used in estimating the revenue, respectively. The revenue generation system may also interact with the item provider computer systems. In some embodiments, the revenue generation system may also cache or stores advertisements to place onto graphical user interfaces for the viewer user and potentially other types of users.

Those skilled in the art will appreciate that the illustrated computing systems are merely illustrative and are not intended to limit the scope of the present invention. The rapid answer computing system 500 may be connected to other devices that are not illustrated, including through one or more networks such as the Internet, the Web, or LAN ("Local Area Network"). More generally, the rapid answer computing system, requester user computing systems, response provider user computing systems, and other computing systems may comprise any combination of hardware and software that can interact in the manners described, including computers, network devices, internet appliances, PDAs ("Personal Digital Assistants"), wireless phones, pagers, electronic organizers, television-based systems and other various consumer products that include inter-communication capabilities. In addition, the functionality provided by the Rapid Answer system components illustrated in FIG. 5 may in some embodiments be combined in fewer components or distributed in additional components. Similarly, in some embodiments the functionalities of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the rapid answer system components or data structures may also be stored (e.g., as instructions or structured data) on a computer-readable medium, such as a hard disk, a memory, a network, or a portable article to be read by an appropriate drive. The access manager components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 6:
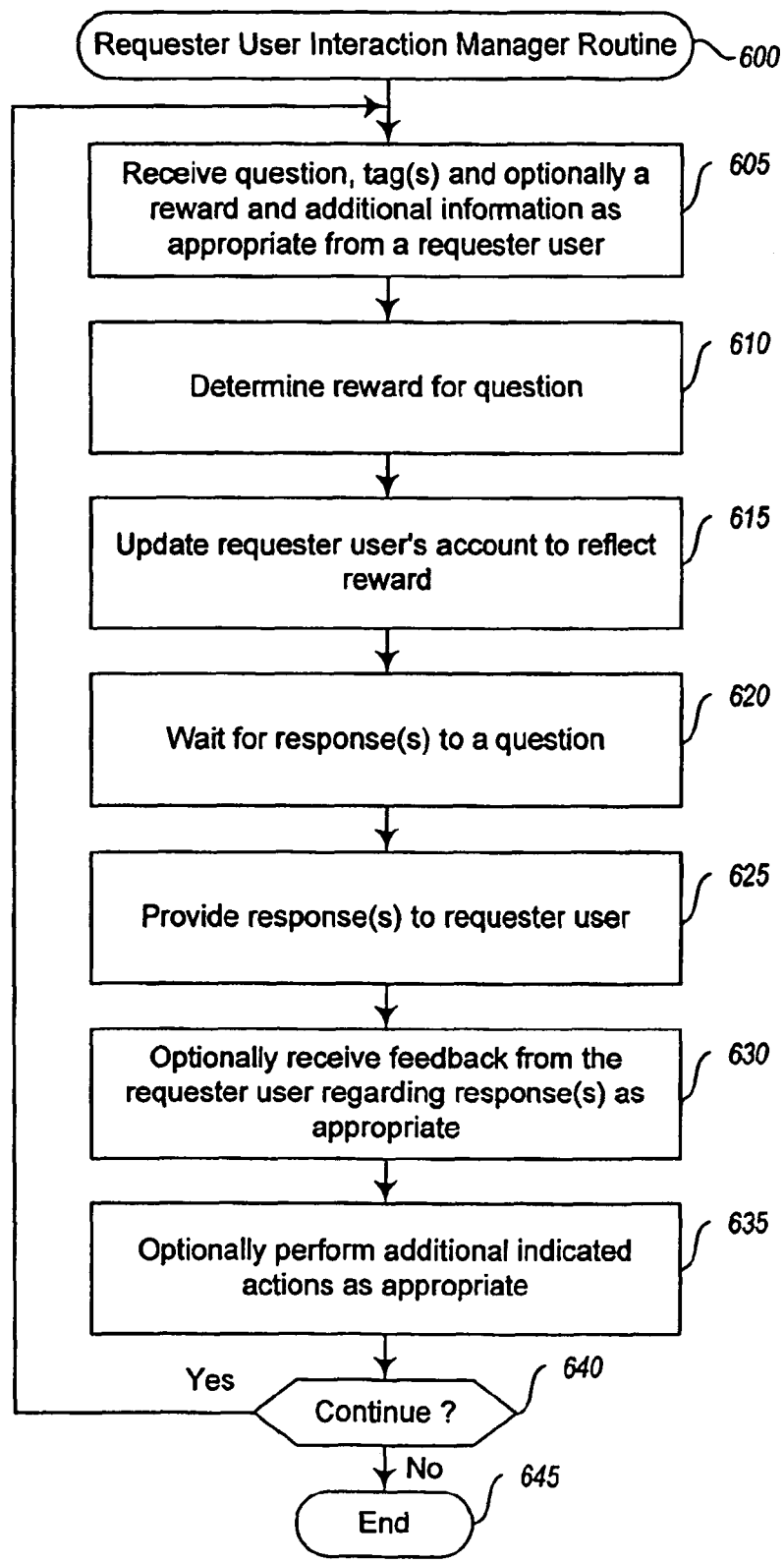
FIG. 6 is a flow diagram of an example embodiment of a Requester User Interaction Manager routine.

FIG. 6 is a flow diagram of an example embodiment of a Requester User Interaction Manager routine 600. The routine may, for example, be provided by execution of the Requester User Interaction Manager component 531 of FIG. 5 such as to receive requests for questions from requester users and after responses are received, display the results. In some embodiments, the routine also allows the user to provide feedback about the responses and reply to requests for clarification.

At step 605, the routine receives a question, one or more tags and optionally a reward and additional information as appropriate from a requester user. Additional information may include information that requester users regularly fail to provide such as the requester user's location or operating system for a computer question. The additional information may also include a time in which the question should be answered and a summary of the question. After step 605, during step 610, a reward is determined for each question. If the user did not specify the reward for the question in points (e.g., instead specified in units of currency), then the Rapid Answer system may convert the reward into a corresponding number of points for later use by the Answer Reward Allocation Manager routine 800. Points may be obtained by requester users in various ways, including by purchasing them from the Rapid Answer system and/or by grant from the Rapid Answer system (e.g., if every requester user receives an initial allotment of points and/or receives additional points on a periodic basis), and in some embodiments a simple exchange rate may be utilized between government currency and points (e.g., 100 points=$1.00).

At step 615, the requester user's account is updated to reflect the reward. For example, if the reward was money, the requester user may be charged the amount during step 615 and if the reward was a number of points, then the points to be used to make request may be deducted. The routine may then wait for the responses to the question at step 620. In some embodiments, since there are a lot of response provider users, responses may be provided within minutes. However, if the question is about local services and it is the middle of the night locally, the response may take longer. In some embodiments, while waiting for a response, the requester user may be asked for clarification of a question. For example, if the requester user fails to provide the requester user's location, then a clarification may involve asking the requester user for the requester user's location. After waiting for the response in 620, at step 625, the responses are provided to the requester user. In some embodiments, such responses may be provided to the requester user via one or more electronic messages (e.g., with each response sent in a separate email message), and the Rapid Answer system may further include a tracking identifier in some or all some electronic messages (e.g., a unique tracking identifier for each electronic message, such as may be randomly generated and associated with the requester user). After providing the responses, the requester user may provide feedback that is received by the routine at step 630. The feedback may take the form of indicating that one or more of the responses is lame, abusive, or excellent. In some embodiments, the feedback may be provided to the Answer Reward Allocation Manager routine 800 so that the point allocation can be adjusted appropriately. In step 635, other operations may be optionally performed. For example, if the question was not answered or all responses were unhelpful or abusive, the update to requester user's account regarding the reward may be rolled back. At step 640, the routine determines whether or not to continue. If so, then the routine continues to step 605. If not, the routine ends at step 645.

Figure 7:
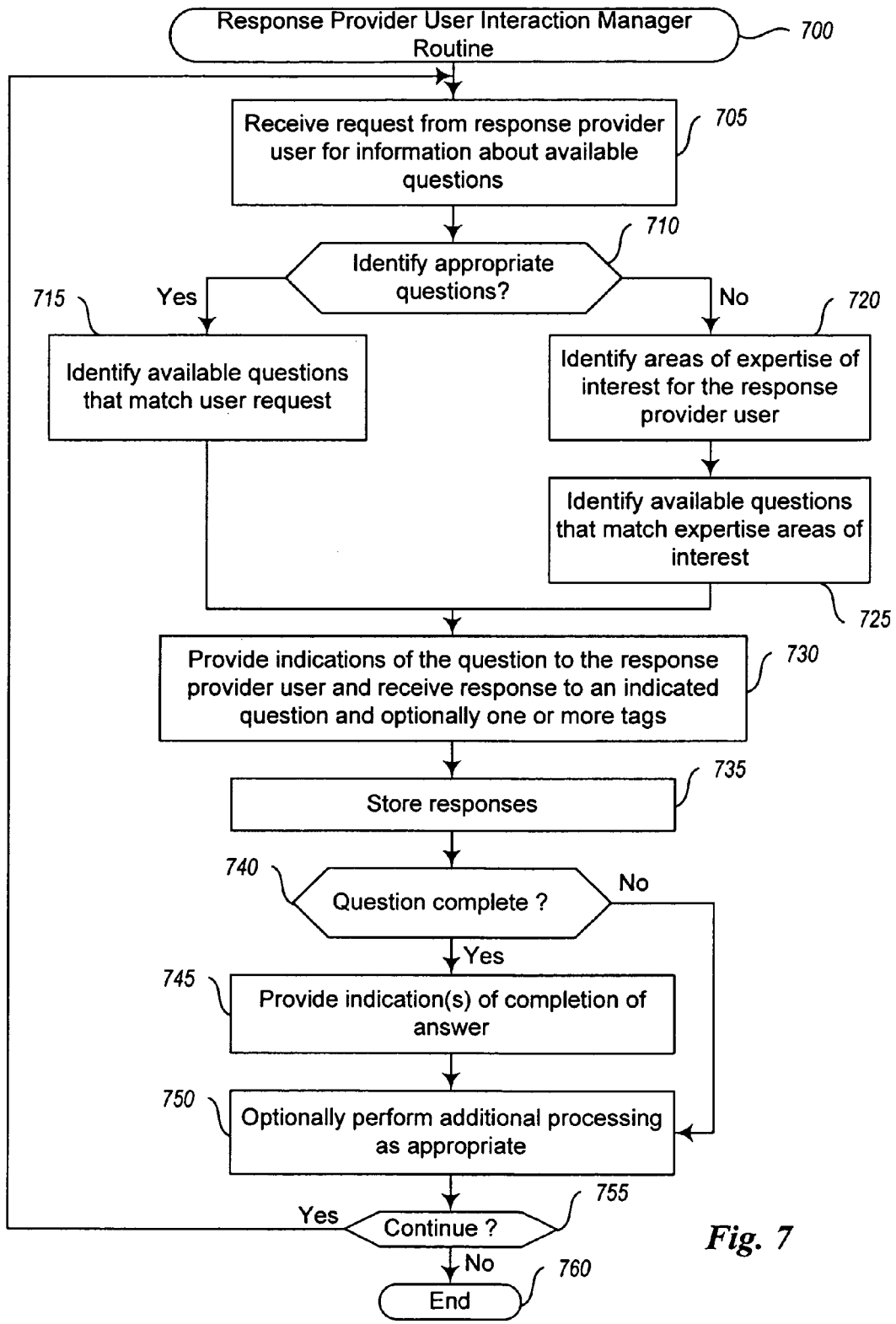
FIG. 7 is a flow diagram of an example embodiment of a Response Provider User Interaction Manager routine.

FIG. 7 is a flow diagram of an example embodiment of a Response Provider User Interaction Manager routine 700. The routine may, for example, be provided by execution of the Response Provider User Interaction Manager component 532 of FIG. 5 such as to allow response provider users to view open questions and receive responses as potential answers to the open questions. This routine may in some embodiments operate in parallel with the Item Provider User Interaction Manager routine 1200 described with reference to FIG. 12, such that response provider users are providing responses to a question at the same time that item provider users are providing paid responses to the question. The routine starts at step 705 where the routine receives a request from response provider users for information about open questions. After receiving the information, the routine determines if the request was a request to identify appropriate questions at step 710. If the request was to identify available questions that match appropriate questions, then at step 715 the routine determines questions that match user requests and continues at step 730. If not, the routine continues at step 720 and identifies areas of expertise of interest for the response provider user. For response provider users that have previously answered a lot of questions, the areas may be identified based on the number of experience points earned for each category. If the response provider user is relatively new, the area of expertise may be determined in some embodiments based on categories the response provider user self-selected upon registration with the Rapid Answer system. After determining the areas of expertise, the routine identifies questions that match the response provider user's area of expertise at step 725. After identifying the open questions, the routine proceeds to step 730.

In step 730, the routine provides indications of the identified questions to the response provider user and receives a response to the indicated question and optionally one or more categories. In some embodiments, the response from the response provider user may include multiple items (e.g., multiple URLs that are the source of the information, a URL and a phone number). After receiving the response, the response is stored in step 735 such as storing the response in the answer database 545 data structure. In step 740, the routine determines if the question is complete. A question may be complete when the time period for the response has expired, after a predetermined number of responses have been received, after a predetermined number of response provider users have given responses to the question, or after the requester user who submitted the question has indicated that the question is complete. If the question is complete, then the routine at step 745 indicates that the question is complete and proceeds to step 750. The indication that the question is complete may also be provided to other components, such as the Answer Reward Allocation Manager 534 of FIG. 5 for purposes of determining reward allocation for the completed question. If the question is determined to not be complete, the routine proceeds to step 750.

During step 750, the routine optionally performs additional processing. In some embodiments, the optional additional processing may include adding additional area of expertise to the response provider user's expertise. Additionally, the routine may in some embodiments at step 750 receive feedback from the response provider users such as voting on the best response, best category and suggesting tags. The routine may also perform the additional processing of determining if any additional rewards such as the ones specified by the requester user are to be awarded and if so, providing the appropriate indications. After the optional additional processing, at step 755, the routine determines whether or not to continue. If so, then the routine continues to step 705. If not, the routine ends at step 760.

Figure 12:
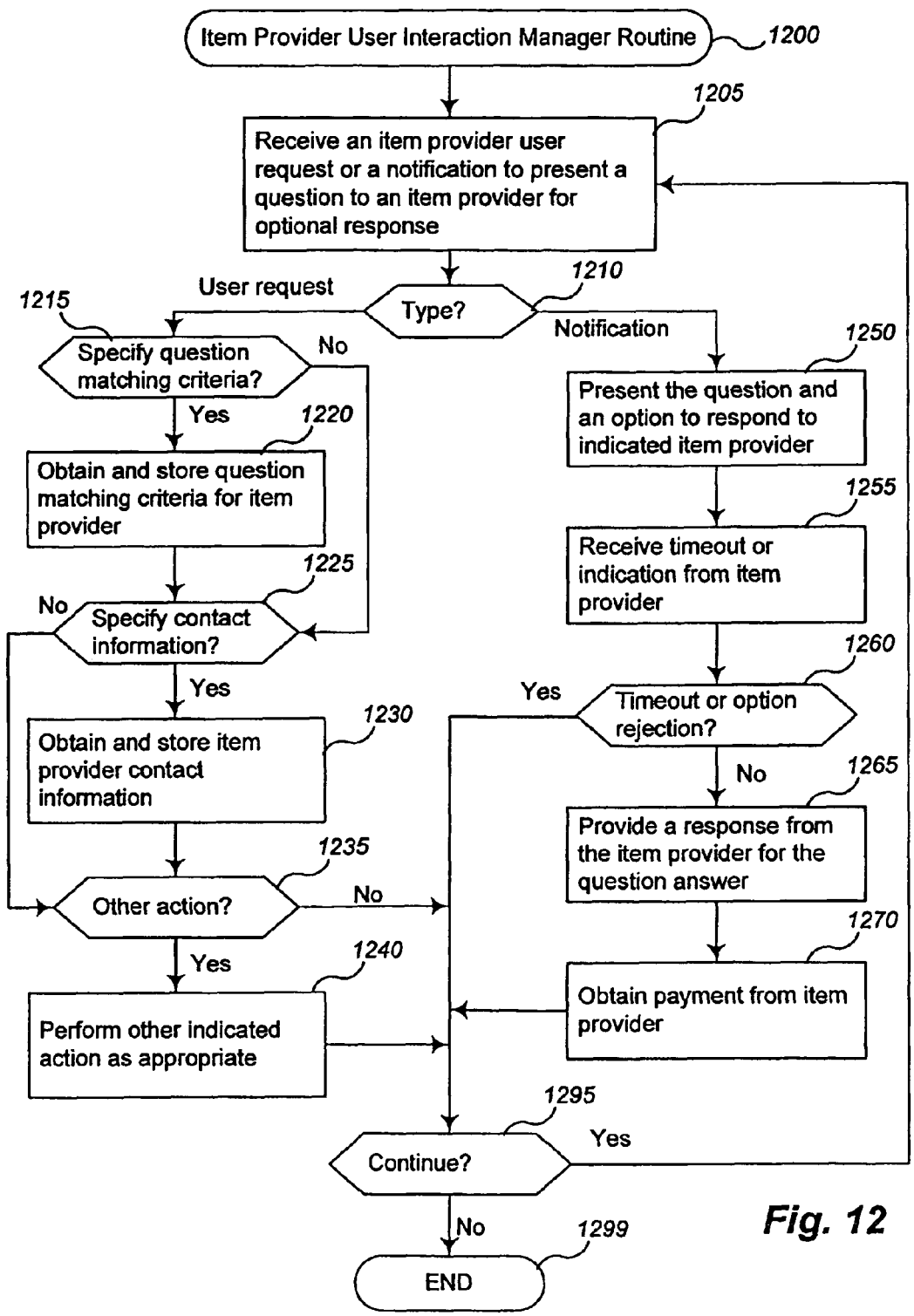
FIG. 12 is a flow diagram of an example embodiment of an Item Provider User Interaction Manager routine.

FIG. 12 is a flow diagram of an example embodiment of an Item Provider User Interaction Manager routine. The routine may be provided, for example, by execution of the Item Provider User Interaction Manager component 533 of FIG. 5. The illustrated routine handles item provider user requests such as specifications of question matching criteria and/or contact information. In addition, the routine responds to notifications to present questions to item provider users by providing questions to, and receiving responses from, item provider users. In some embodiments, the routine may run in parallel to other routines, such as the Response Provider User Interaction Manager routine of FIG. 7.

The Item Provider User Interaction Management routine 1200 begins in step 1205 and receives an item provider user request or a notification to present a question to an item provider user for an optional response. In some embodiments, an item provider user request may be received, for example, from a user interface component that displays a GUI screen such as the one described with reference to FIG. 2H. In some embodiments, a notification to present a question to an item provider user may be received from, for example, the Requester User Interaction component 531 of FIG. 5 upon the receipt of a question provided by a requester user. In step 1210, the routine determines whether an item provider user request or a notification was received. If it is determined that an item provider user request was received, the routine proceeds to step 1215. Item provider user requests may be received by way of a user interface such as the one described with reference to FIG. 2H. In step 1215, the routine determines whether the item provider user request is to specify question matching criteria. If so, the routine proceeds to step 1220, and obtains and stores question matching criteria (such as those described with reference to FIG. 2H) for the item provider that made the request. If it is instead determined in step 1215 that the item provider user request does not specify question matching criteria, or after step 1220, the routine proceeds to step 1225 and determines whether the item provider user request is to specify contact information for the item provider user. If so, the routine proceeds to step 1230 and obtains and stores contact information for the item provider user. If it is instead determined in step 1225 that the item provider user request is not to specify contact information, or after step 1230, the routine proceeds to step 1235 and determines whether some other action is indicated by the item provider user request. If so, the routine proceeds to step 1240 and performs the other indicated action as appropriate. Other actions may include item provider user account operations, such as setting up or modifying payment mechanisms, modifying one or more pre-configured responses, etc.

If it is instead determined in step 1210 that a notification has been received, the routine proceeds to step 1250 and presents the question and an option to respond to the indicated item provider user of step 1205. In step 1255, the routine waits to receive a timeout or to receive an indication from the item provider user. As described in more detail elsewhere, the item provider user may have a pre-determined period of time in which to accept or reject the option to provide a response to the question. During the pre-determined time period, the item provider user may explicitly indicate that they have either accepted or rejected (e.g., by activating the appropriate user interface controls, such as those described with reference to FIGS. 2I and 2J). Alternatively, if the item provider user does not respond within the pre-determined time period, of if they respond after the pre-determined time period, it will typically be treated as a rejection of the option. In step 1260, the routine determines whether a timeout or an indication of option rejection has been received. If neither a timeout nor an option rejection has been received, the routine proceeds to step 1265 and provides a response from the item provider user for the question answer. The response provided by the item provider user may be incorporated with or otherwise displayed as part of the answer provided to the requester user, as shown, for example in FIG. 2K. In step 1270, the routine obtains payment from the item provider user. Payment may be obtained by various techniques, including electronic funds transfers between bank accounts (e.g., debits from an item provider account), credit card payment processing, etc. In some embodiments, the actual payment for an individual response may be aggregated in an account, which may be billed to the item provider user on a periodic (e.g., monthly) or other (e.g., when the account value reaches or exceeds a pre-determined threshold amount). Other embodiments may elect to delay obtaining payment until a condition is met, such as when the requester user is actually provided the response (e.g., by serving a Web page that displays the answer containing the response), or when the requester user actually selects (e.g., clicks a URL provided by the item provider user) or otherwise indicates that they are viewing or otherwise showing interest in the provided response and/or answer that includes response.

If it is instead determined in step 1235 that the request does not indicate some other action, or if it is instead determined in step 1260 that a timeout or an option rejection has been received, or after steps 1265 and 1240, the routine proceeds to step 1295 and determines whether to continue. If so, the routine proceeds to step 1205 and continues processing. If not, the routine proceeds to step 1299 and ends.

Figure 8:
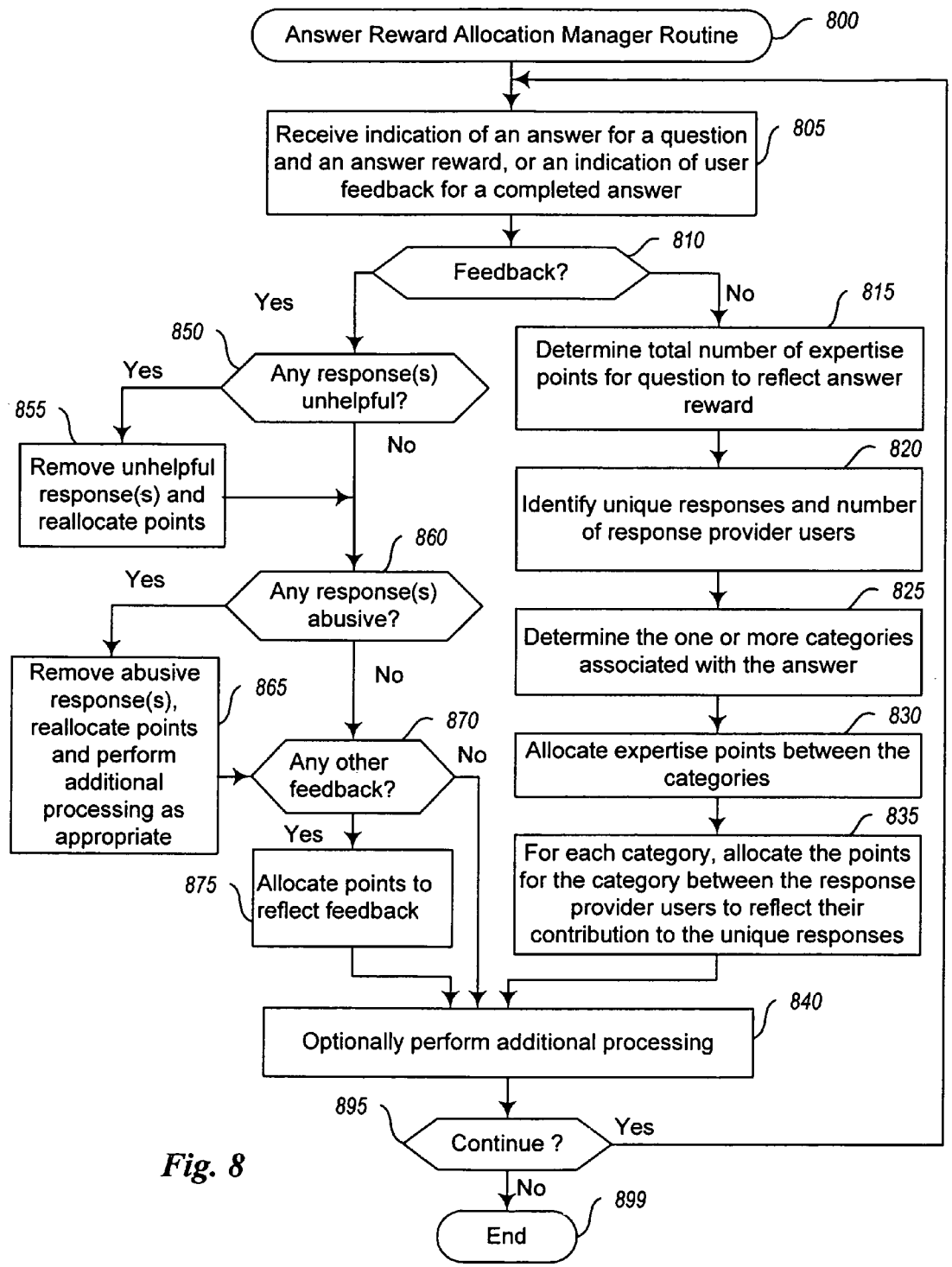
FIG. 8 is a flow diagram of an example embodiment of an Answer Reward Allocation Manager routine.

FIG. 8 is a flow diagram of an example embodiment of an Answer Reward Allocation Manager routine 800. The routine may, for example, be provided by execution of the Answer Reward Allocation Manager component 534 of FIG. 5 such as to determine the award allocation and may revise the allocation after feedback from the requester user that asked the question. The routine begins at step 805 where the routine receives an indication of requester user feedback for a completed answer or an indication of an answer for a question and an answer reward. In step 810, the routine determines if the indication was feedback from the requester user. If so, the routine proceeds to step 850. If not, the routine proceeds to step 815 where the total number of experience points for the question is determined. If the requester user used points to ask a question, then in some embodiments those points will be used as the total number of experience points for the question. If not, the number of experience points for the question may in some embodiments be a predetermined number of points for each dollar of a monetary reward or a predetermined number of points for each request.

After determining the total number of experience points for the question, the routine identifies unique responses and the number of response provider users that provided a response used in the answer in step 820. After identifying unique responses and the number of response provider users, the routine proceeds to step 825 and determines the one or more categories associated with the answer. The determination of categories is described in more detail with reference to the Answer Categorization Manager Routine 1000 of FIG. 10. After determining the categories, the number of points for each category is determined in step 830. In some embodiments, the number of points per category may be determined by dividing the total number of points by the number of categories, such as described in more reference to FIGS. 3A-3C.

During step 835, the routine allocates for each category the points for the category between the response provider users to reflect their contribution to the unique responses. The routine continues to step 840. In step 840, the routine optionally performs additional processing such as in some embodiments updating the area of expertise of the response provider user. In some embodiments, the additional processing may also provide indications of bonuses awarded to the response provider user (e.g., to the response provider user account DB 542 for use by other components, such as the Answer Experience Level Incentive Manager 537 or the payment component 538 of FIG. 5). After optionally performing the additional processing, at step 895, the routine determines whether or not to continue. If so, then the routine continues to step 805. If not, the routine ends at step 899.

If in step 810 the routine determines that the request was for feedback from a requester user, then the routine proceeds to step 850 where the routine determines if one or more responses were marked unhelpful. If so, then the routine proceeds to step 855 where the unhelpful response(s) are removed from the reward allocation and the points reallocated appropriately. An illustration of an embodiment of how to reallocate points for an unhelpful response is demonstrated in FIG. 3B. After adjusting the point allocation appropriately or if no responses were marked unhelpful, the routine continues to step 860 where the routine determines if any of the responses were marked as abusive. If so, in step 865, the appropriate penalty for the response(s) marked as abusive is awarded and points are reallocated. The appropriate penalty may involve removing the responses marked as abusive and not awarding any points for other responses from response provider users that provided the abusive response. An illustration of an example embodiment of how to reallocate points for an abusive response is demonstrated in FIG. 3C. After removing the abusive response and reallocating points or if there were no responses marked as abusive, the routine continues to step 870. In step 870, the routine determines if other feedback has been received. Additional feedback may include best response, best response provider user, and other positive feedback. If a response is elected to be the best answer, a number of bonus points may be awarded in some embodiments to the response provider user that provided the response. For example, best answer information may be leveraged to determine the order to display previously answered questions to viewer users within a category.

Figure 9:
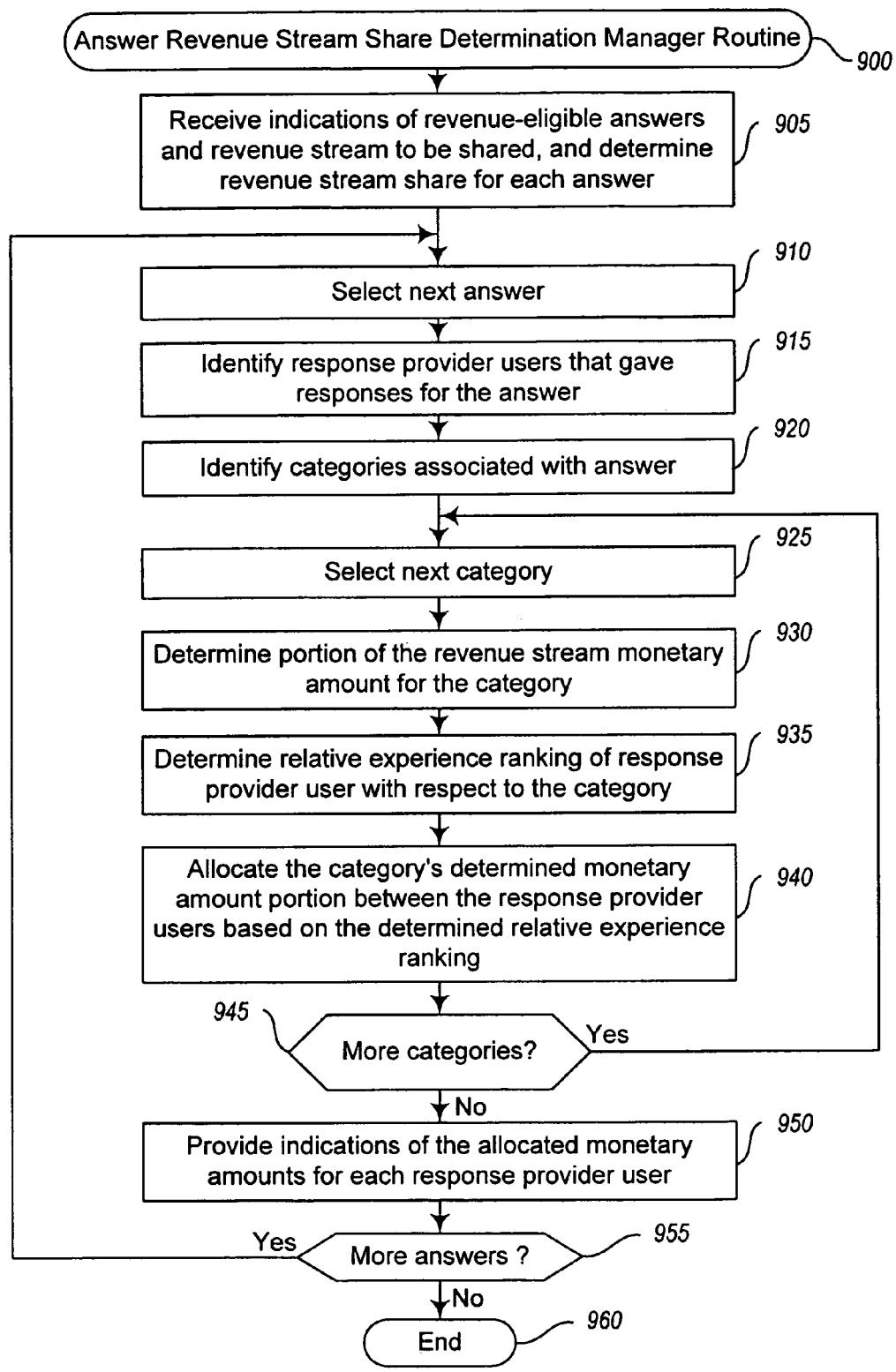
FIG. 9 is a flow diagram of an example embodiment of a Revenue Stream Share Determination Manager routine.

FIG. 9 is a flow diagram of an example embodiment of an Answer Revenue Stream Share Determination Manager routine 900. The routine may, for example, be provided by execution of the Answer Revenue Stream Share Determination Manager component 535 of FIG. 5, such as to determine the revenue stream share that each eligible response provider user receives for eligible answers. The revenue stream itself may be generated by, for example, the revenue generation system 525 of FIG. 5. The routine starts at step 905 where the routine receives indications of revenue-eligible answers and the revenue stream to be shared. During step 905, the routine also determines the revenue stream for each question. In some embodiments, the revenue stream may be the actual or an estimate of the revenue generated for the answer; however, in other embodiments, the revenue stream per answer may also be determined by dividing a predetermined percentage of the revenue stream by the number of revenue-eligible answers. In order to estimate the revenue generated for each question, many factors including the number of times the answer has been viewed, the number of unique users that viewed the answer, the popularity of the category may be utilized. All answers may not be revenue-eligible since answers may only provide an ongoing revenue source for a limited period of time. In addition, in some embodiments, some of the answers may not be revenue-eligible at all, such as answers with which the rapid answer system was initially seeded, answers that do not include any responses from revenue-eligible response provider users, or answers where the requester user was also a response provider user. The revenue-eligibility of a response provider user may be based on various factors, such as any enhanced status of the response provider user and/or whether the response provided by the response provider user received any negative feedback (e.g., was marked lame or abusive). Some answers may also not be revenue-eligible at the time the routine is run if less than all the revenue-eligible answers are being processed at the current time (e.g., running the routine on an answer anniversary and the current time is not the anniversary of the question).

At step 910, the next answer is selected. If this is the first question, then the first question may be selected. After selecting the answer, the routine identifies the response provider users that gave responses for the answer and are eligible to receive the revenue share at step 915. Response provider users may not be eligible after the period of time for sharing revenue for non-preferred users has passed unless enhanced status has been granted for at least one of the categories associated with the answer. Thus, the routine may need to check on the enhanced status of the response provider users. After determining the response provider users that provided a response for the answer in step 915, in step 920, the categories for the question are identified. In some embodiments, categories may have been automatically determined by a routine such as the Answer Categorization Manager routine described with reference to FIG. 10. The next category is selected in step 925 and in step 930 the portion of the revenue stream for the category may be determined. In some embodiments, the amount for each is category is determined by dividing the revenue determined for the answer by the number of categories associated with the answer while in other embodiments the revenue may be adjusted by the relative popularity of the categories. After determining the amount of money for the selected category, the routine determines the relative experience ranking of the response provider users with respect to the selected category in step 935. In step 940, the routine allocates the category's determined monetary amount between the response provider users based on the relative ranking. During step 940, the routine may determine if a response provider user is eligible to receive a revenue share for this category at all. Response provider users that do not have enhanced status for this category may not be eligible after a predetermined period of time when normal users may no longer receive the ongoing revenue share. In step 945, the routine determines if there are any more categories. If so, the routine returns to step 925 to select the next category. If not, the routine proceeds to step 950.

During step 950, the routine provides indications of the allocated monetary amounts. In some embodiments, the routine will pass the indicated monetary amounts to the payment component 538 of FIG. 5; however, in other embodiments, the amounts may be stored in the response provider user account DB 542 of FIG. 5 until the payments reach a predetermined amount of money. At step 955, the routine determines whether or not there are more revenue-eligible answers. If so, then the routine continues to step 910. If not, the routine ends at step 960.

In some embodiments, at least part of the revenue stream is shared with the response provider users who provided responses used in the answer to a particular question on an ongoing basis. However, the ongoing revenue stream sharing may end after a period of time, such as 12 months. In some embodiments, a user may extend that period of time by attaining enhanced incentive level status. Enhanced status may be determined in a number of ways, such as based on the total number of experience points accumulated by a given response provider user within a category or the relative ranking of a response provider user (e.g., top 10%) in a particular category, or instead in a manner that is not specific to a category. Enhanced status may confer a number of benefits, including receiving notifications of new questions associated with one or more categories, and automatically accepting a question to be answered by a response provider user (e.g., if the question matches indicated criteria). In some embodiments, enhanced status may also allow preferred response provider users having enhanced status to continue to receive ongoing payments for the responses for a longer period of time than non-preferred response provider users. Thus, response provider users are advantageously incentivized to continue to provide answers in order to continue to receive the revenue stream share for the response provider users' historical responses. In some embodiments, there may further be multiple levels of enhanced status. In some embodiments, if a response provider user was voted to have the best response for an answer or to be the best response provider user for that question, the response provider user may be granted quasi-enhanced status in which the user gains the benefit of having enhanced status for that answer only, thereby allowing the quasi-enhanced response provider user to continue to receive a revenue share for that answer for an extended period of time. As a result, a casual response provider user may be incentivized to provide high-quality responses. Additional details regarding the determination of incentive level status for response provider users are provided with reference to FIG. 11.

Figure 10:
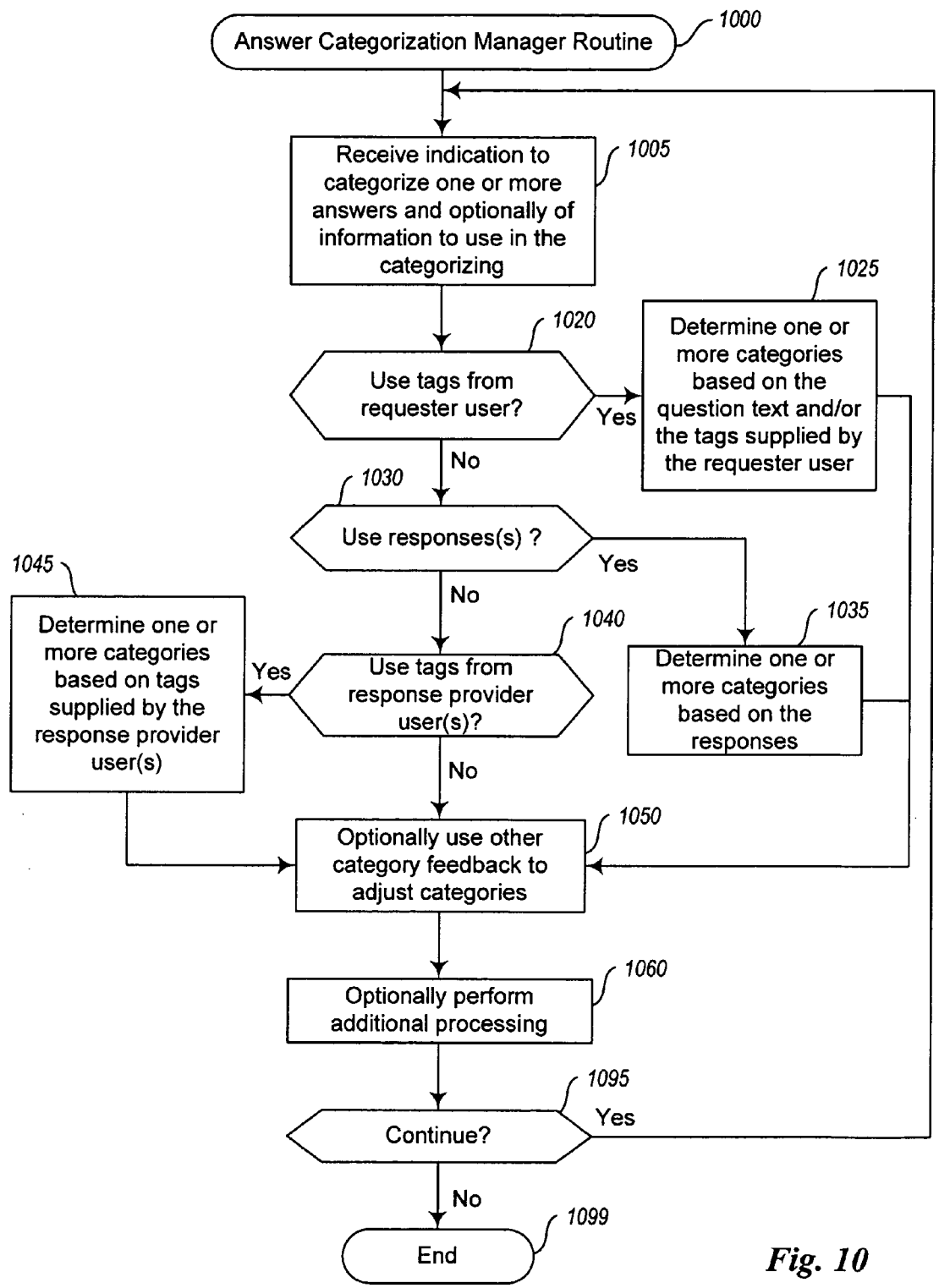
FIG. 10 is a flow diagram of an example embodiment of an Answer Categorization Manager routine.

FIG. 10 is a flow diagram of an example embodiment of an Answer Categorization Manager routine 1000. The routine may, for example, be provided by execution of the Answer Categorization Manager component 536 of FIG. 5 such as to categorize answers to make locating questions to be answered and answers easy as well as to allow response provider users to gain expertise in categories. This routine may be invoked in various ways, such as by the Answer Reward Allocation Manager Routine of FIG. 8 or on a periodic basis, and in parallel to other routines described herein. The routine starts at step 1005 where an indication to categorize one or more answers is received along with optionally additional information to use in the categorizing. The additional information needed will be discussed in great detail below. After step 1005, the routine proceeds to step 1020 where the routine determines whether the indication to categorize was based on tags supplied by the requester user. If so, in step 1025, the routine determines one or more categories based on the question text including the summary and/or the tags supplied by the requester user. In some embodiments, at least one of the tags may become a category, while in other embodiments the system determines the category based on what category previous answers tagged with the same tags were categorized. After determining the one or more categories, the routine proceeds to step 1050.

If it is instead determined in step 1020 that the indication was not to categorize based on tags supplied by the requester user, the routine proceeds to step 1030 and determines if the indications to categorize were based on responses. If so, the routine determines one or more categories based on the responses at step 1035. The routine may categorize based on the responses in some embodiments by checking to see if the response has previously been given, and if so, of which category associated with the answer the response is a part. In some embodiments, this may be performed only on certain types of responses such as links or phone numbers instead of opinions. In some embodiments, categories may only become associated with the answer if two or more responses were associated with the same category. After determining one or more categories based on the responses, the routine proceeds to step 1050.

If the request was not to categorize based on the responses, the routine proceeds to step 1040 where the routine determines if the request was to use tags from the response provider user to categorize the answer. If so, the routine proceeds to 1045 to determine one or more categories based on the tags supplied by the response provider users. The routine may perform this in a similar manner to categorizing on tags supplied by the requester user. After determining one or more categories based on tags supplied by response provider users or if the request was not to use tags from response provider users, the routine proceeds to step 1050.

In step 1050, the routine may use other category feedback to adjust the categories associated with the answer. For example, response provider users may vote on the best category in some embodiments. If a response previously used to determine a category was removed since it was unhelpful or abusive, the routine may decide if one or more categories should be unassociated with the answer as a result. Conversely, if a response was marked as the best response, then all of the categories associated with the best response from previous answers may become associated with the answer. After using the other feedback to adjust categories, at step 1060, the routine optionally performs additional processing. The additional processing may include sending indications to the Answer Reward Allocation Manager routine 800 (e.g., to start the reward allocation now that categories are determined) or updating the index used for browsing the answers. After performing the additional processing, in step 1095, the routine determines whether to continue. If so, the routine returns to step 1005. If not, the routine ends at step 1099.

Figure 11:
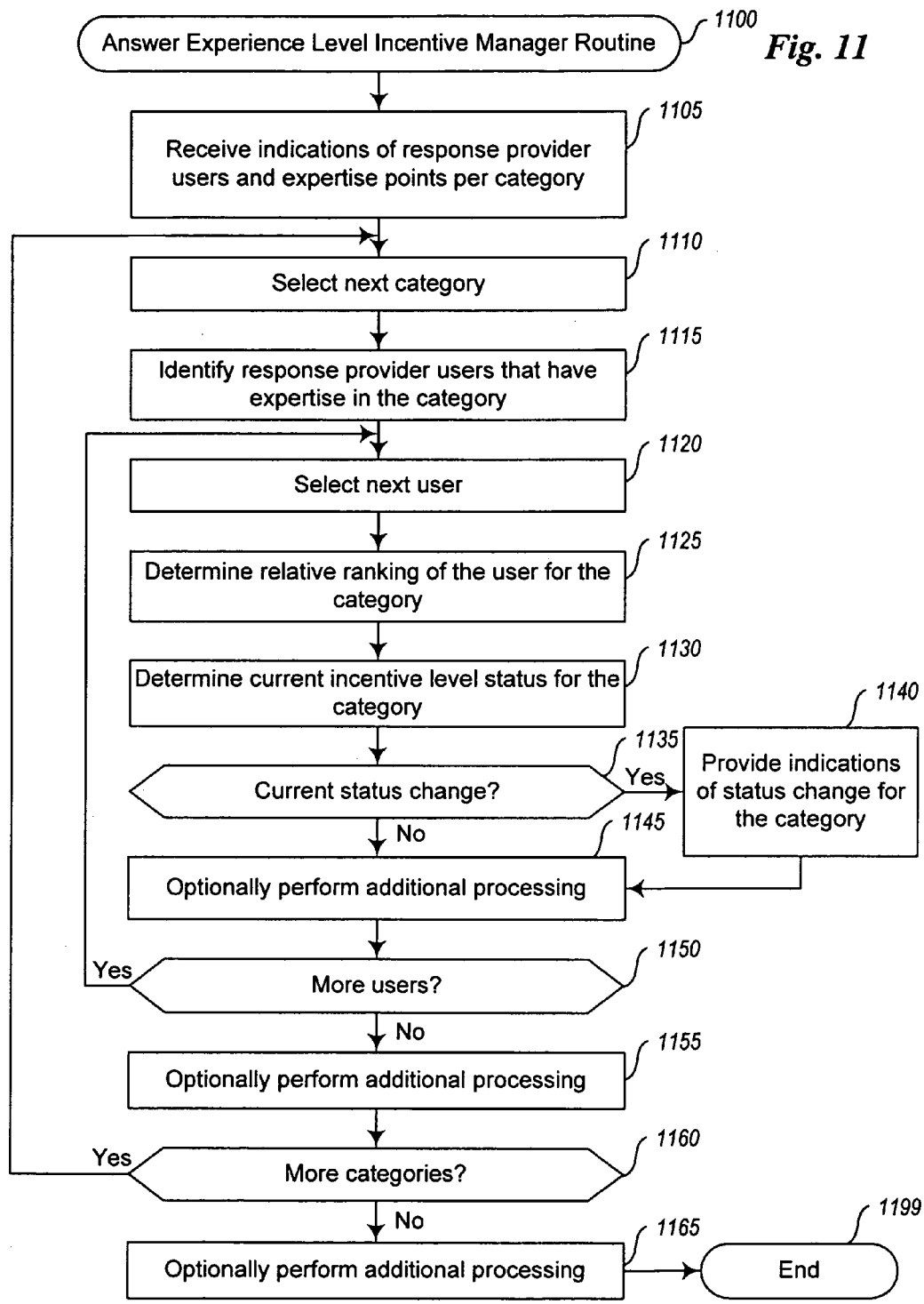
FIG. 11 is a flow diagram of an example embodiment of an Answer Experience Level Incentive Manager routine.

FIG. 11 is a flow diagram of an example embodiment of an Answer Experience Level Incentive Manager routine 1100. The routine may, for example, be provided by execution of the Answer Experience Level Incentive Manager component 537 of FIG. 5 such as to determine the revenue stream share that each eligible response provider user receives for eligible questions. In some embodiments, the routine may execute periodically in order to determine response provider user expertise levels for use by other system components, such as the Answer Reward Allocation component 534 of FIG. 5. The routine starts at 1105 where the routine receives indications of response provider users and experience points per category for each response provider user. In step 1110, the next category or if this is the first category, the first category is selected. In step 1115, the routine identifies response provider users that have expertise in the category based on having at least a determined threshold of experience points in the category. In step 1120, the next user (or the first user, if this is the first user) is selected. After the user is selected, in step 1125, the routine determines the relative ranking (e.g., ordered by increasing number of experience points) of the user for the category. In some embodiments, the relative ranking is stored in the response provider user DB 542 data structure so that it may be displayed in the account graphical user interface as shown in FIG. 2F. Using the relative ranking of the user, the routine then determines the current incentive level status for the category in step 1130.

After determining the current status, the routine determines if the current incentive level status is a change from the previous incentive level status at step 1135. If so, the routine continues to step 1440 to provide indications of the incentive level status change for the category (e.g., providing indications to the Answer Revenue Stream Share Determination Manager component 535 of FIG. 5, turning on and off enhanced status functionality). If the current incentive level status has not changed or after providing the appropriate notifications, at step 1145, the routine optionally performs additional processing. The additional processing may include checking if any bonuses have been earned. After performing the optional processing, the routine determines if there are additional response provider users with expertise in the category at step 1150. If so, the routine returns to step 1120. If not, the routine optionally performs additional processing at step 1155. Optional processing may include indications to store the rankings or changing the size of a category based on its popularity. After performing the additional processing, the routine determines if there are more categories at step 1160. If so, the routine returns to step 1110. If not, the routine proceeds to step 1165 to perform additional processing which may include identifying if any bonuses are to be awarded based on cumulative point milestones or total points earned within a period of time. The routine then ends at step 1199.

In some embodiments, at least some of the types of users may sign up with the rapid answer system and receive a user account. In some embodiments, the account may be a more general account as part of other sites and/or services provided by the rapid answer system or as part of a federation of sites that the rapid answer system participates in. In addition, in some embodiments, at least some of the types of users may also register to receive a special purpose account such as a special account for receiving or making payments. In some embodiments, each type of user (e.g., response provider user, requester user) has a separate account while in other embodiments the same account may be shared for all or some of the types of users. The account then may hold information about the user including a username and password for user authentication, the amount of points earned, payment information, categories associated with the user, enhanced status, and rankings.

Requester users may ask questions and responses may be received from response provider users. One or more responses may be used as an answer to a question and some responses (e.g., abusive responses) may not be used as part of the answer. Potential responses include, but are not limited to, one or more indications of network-accessible resources sites (e.g., a URL ("Uniform Resource Locator") or a URI ("Uniform Resource Identifier")) where the response provider user found the information, book/magazine citations, database citations, phone numbers, email addresses and opinions. In addition, in some embodiments item provider users that provide products or services may pay money to provide additional responses relating to their products or services. Viewer users may review the answers to previously answered questions. However, the type of a user is not mutually exclusive. Thus, in some embodiments a user that asks a question about plumbers in Seattle may still answer questions relating to martial arts and/or review previously answered questions about solving a margin problem in the Microsoft Word™ word processing application. In some embodiments, a given user may indicate the role (e.g., requester user, response provider user, item provider user, viewer user, etc.) that the user is currently performing in order to access and/or receive the appropriate graphical user interface for interacting with the Rapid Answer system. For ease of understanding, however, the different types of users are referred to as if the various types of users are distinct. Furthermore, in some embodiments, at least some of the users may be an entity (e.g., corporation, group, association, etc.) and not an individual person.

Questions and answers to those questions may be gathered via the Rapid Answer system. Various types of questions may be asked via the Rapid Answer system. Questions may in some embodiments be as varied as finding local products or services, to determining what foods are healthy, to finding reasons for cleaning fuel injectors. Questions include any request for information whether or not the request ends in a question mark or multiple inquires are made within a single question. In addition, in some embodiments the topics of at least some of the questions may be restricted. For example, in some embodiments, only questions about one or more predetermined topics (e.g., local products and/or services) may be asked and answered. In other embodiments, questions deemed inappropriate (e.g., adult topics and/or topics involving potentially illegal activity) may be prohibited or restricted (e.g., by enforcing age restrictions on access to adult content) as appropriate.

A requester user may indicate a question and one or more tags for the question. In some embodiments, the Rapid Answer system suggests tags based on term words in the question text, tags indicated by the requester user, and/or metadata associated with the question and/or requester user. In some embodiments, additional information (e.g., summary text, an amount of time during which a question may be available and/or active for users to provide responses, etc.) may be supplied by the requester user. The question may be presented to response provider users in order receive responses to the question. Questions may be presented to users in various ways including programmatic notifications via email, instant messaging or other suitable method based on term words within the question and/or categories associated with the prospective answer to the question. In addition, presented questions may be arranged by term words, category, initial reward type, reward value, the time the question was made, and/or the time the questions expire. In some embodiments, users may access questions via full-text search. In some embodiments, at least some of the response provider users may not have the ability to have questions presented to them in all of the previously mentioned manners. In addition, the number of response provider users may be limited to a predetermined number; thus, response provider users may indicate that they are working on a response in some embodiments.

Response provider users may then provide responses to the questions. Factual responses may in some embodiments require the response provider user to acknowledge the source of the information. If clarification is needed to answer a question, a response provider user or an item provider user may ask for clarification from the requester user in some embodiments. In some embodiments, previous responses from other response provider users may be hidden from other response provider users. When a question is finished, at least some of the responses may become an answer to the question and a number of experience points may be awarded for the unique responses to the question. In some embodiments, at least some of the responses may not be used in the answer, such as responses that are abusive or lame (i.e. unhelpful). A question may be considered finished in various ways such as after an indicated time period for the questions has elapsed, after a predetermined number of responses, or after responses from a predetermined number of response provider users.

Experience points may be awarded for each category. In one embodiment, experience points for the question may be determined and then divided by the number of unique responses. Then, the points for a unique response may be divided by the number of response provider users that provided the response. In some embodiments, the determined point allocation for each of the response provider users is divided by the number of categories associated with the answer. Categories may include in some embodiments one or more associated tags and may be automatically generated from the responses and/or tags supplied by both requester users and/or response provider users. In addition to awarding experience points, the response provider user may in some embodiments be provided with at least a portion of the requester user-specified reward or a reward for one or more bonuses (e.g., for the best answer, best response provider user). Additional details related to experience point allocation are provided elsewhere.

Responses may be presented to the requester user and/or viewer users. In some embodiments, a user may see responses as they are provided by, or received from, response provider users. Various other items, including advertisements, responses from item provider users, and/or sponsored links may be displayed along with the responses. Additional methods of generating revenue other than advertisements may also be utilized to generate a revenue stream.

In some embodiments, a requester user may provide feedback about various responses such as marking the response as lame (e.g., on topic but unhelpful) or abusive (e.g., off-topic response). In addition, in some embodiments, if the response to a question was an opinion, the requester user may request one or more follow-ups to the opinion. In some embodiments, response provider users that provided a response to a question may also provide various types of feedback about the question and/or its associated responses, before and/or after experience points are allocated. For example, response provider users may in some embodiments be able to suggest tags, vote on a best (or even a primary) tag for the answer to be used in identifying a category for the answer, vote for the best response, vote for the best response provider user for a given question, or indicate that a response is lame or abusive. In some embodiments, other users who did not provide a response to the question may also provide feedback. As a result of user-provided feedback, the expertise point allocation for the responses may be altered accordingly. Additional details related to feedback are described below.

In some embodiments, since at least some individual payouts of cash to, for example, a response provider user may be small, the amount earned may be aggregated until the amount of money earned exceeds a predetermined amount of money (e.g., $5.00). In some embodiments, the amount owed the response provider user may be associated with the response provider user's account and include all earnings whether from the revenue sharing, initial reward (if any), and any cash bonuses. In addition, in some embodiments, instead of awarding cash, a non-cash equivalent value may be alternatively awarded such as gift certificates or frequent flier miles (or other loyalty points). Some or all of the bonuses such as receiving a certain milestone in experience points in a category may be added to money owed the response provider user or given as a non-cash gift (e.g., gift certificate).

In some embodiments, when a requester user submits a question, the Rapid Answer system may check to see if the same question has been recently asked and answered. If the system determines that question has been previously asked and answered, then the Rapid Answer system may provide the answer to the previously asked question and not present the question to response provider users. In some embodiments, as a result, no experience points are awarded; while in other embodiments, bonuses may be awarded to response provider users that previously answered the previously asked question or the revenue stream share for that question adjusted (e.g., more revenue allocated for the question).

As noted above, some embodiments may interact with or otherwise utilize systems for interacting with human users to supply tasks to be performed and to receive corresponding results. As described in more detail in U.S. patent application Ser. No. 10/990,949, some such systems may provide functionality related to obtaining and using information about qualifications of users such as to allow other users to identify and/or specify types of users with whom to conduct transactions. In some embodiments, qualifications may be automatically determined for response provider users and utilized to determine which response provider users may be provided access to particular questions. For example, qualifications may be associated with tags and/or categories that are utilized in conjunction with questions, responses, and answers. As response provider users provide answers and thereby gain experience points and corresponding expertise levels in particular categories, they may be granted qualifications associated with those categories, which may in turn enable the response provider users to gain access to questions that require such qualifications. In addition, requester users may further associate qualifications with provided questions in at least some embodiments such that the provided questions may only be accessed by and/or answered by response provider users who have obtained the appropriate qualification. In addition, qualifications may be automatically associated with questions based at least in part on the tags and/or categories associated with such questions (e.g., associate a Java programming qualification with a question that uses the tag "Java"). Embodiments may also associate qualifications with questions based on other factors, such as if the reward offered for a particular question is greater than a predetermined amount (e.g., associating qualifications with questions that have rewards greater than $5, where the type of qualification is based on one or more tags associated with the question).

In some embodiments, systems for interacting with human users to supply tasks to be performed and to receive corresponding results may be utilized to specify tasks related to questions, responses, and/or answers and assigning such tasks to human users for performance. For example, tasks may be specified that consist of categorizing questions, and human categorizer users may perform such tasks by choosing appropriate categories for questions and/or answers based on associated content, metadata, and/or tags. Such categorizer users may be rewarded in various ways, such as with money and/or by earning experience points or qualifications related to performing categorization tasks. Other types of tasks to be performed by human users are also contemplated, including tasks that consist of editing or otherwise improving the quality of supplied questions and/or responses. For example, human performance tasks may be generated that include selecting or otherwise editing tags associated with questions, or editing the content of questions and/or responses to improve grammar or other characteristics.

As previously discussed, in some embodiments electronic messages may be used to send commands to the Rapid Answer system. In one example embodiment, a non-exclusive list of such commands are as follows:

| Command Name | Description |
| --- | --- |
| unhelpful | indicates that a particular response is not satisfactory |
| abusive | indicates that a particular response is inappropriate and/or spam |
| like | indicates that a particular response is good |
| best | indicates that a particular response is great |
| buy x | allows a user to buy more question submissions and/or items from one or more item suppliers |
| pay x y | allows a user to pay another user x an indicated amount y |
| confirm x | confirms a previously indicated purchase |
| reject | explicitly cancels a prospective purchase |
| help | provides a list of available commands |
| resubmit | allows a requester user to resubmit a question if not satisfied with any of the responses; may only be available once for each question |
| info | gives basic information about a user's account, such as number of questions remaining, list of last 20 questions asked by the user, and unique identifiers for the questions |
| search x | allows a user to search for questions |
| view x | allows user to see answers to question x |
| categories | provides most popular categories that the user has not subscribed to |
| sub x | allows a user to subscribe to category x |
| unsub x | allows a user to unsubscribe to category x |
| join x | indicates the user wants to receive emails about responses to and comments about question x |
| unjoin x | indicates the user no longer wants to receive emails about responses or comments for question x |
| block x | prevents the sending of any more responses or comments from user x |
| find x | locates one or more items corresponding to x and displays the price, the items may be subsequently purchased using the buy command |

In the table, x and y are parameters that may follow a command, although in some cases the parameters may be optional. For example, "confirm" may in some embodiments not require a parameter. This list of commands is merely exemplary, and in other embodiments more or less commands may be available.

In some embodiments, the commands may further be used as part of a message authentication process. For example, after a requester user has set up an account with payment information, when a requester user needs to buy more questions, the requester user may send a message to "buy@rapid-answer.com" and in the body of the message type "buy XX" where XX is the number of questions that the requester user wants to purchase. After the Rapid Answer system receives the message from the requester user, the system may send back a confirmation request message to confirm the purchase, with the message having a tracking identifier. When the user receives the confirmation request message, the user may reply to the message by typing in "confirm ####", where #### is the user's 4-digit PIN. If the user entered the wrong number of questions to buy, the user may also send a message with the "reject" command to prevent the transaction from occurring. When the Rapid Answer system receives this message, it matches the tracking identifier and the 4-digit PIN, and if both match the system completes the transaction. Such a combination of the tracking identifier and knowledge of the PIN facilitates authentication of the user.

The commands may also be used in other manners in some embodiments. For example, a user may be able to search for and buy items via a mobile device. First, the user signs up for one or more mobile services and selects a preferred payment option (e.g., by placing a credit card on file), a preferred delivery address (e.g., home address) and delivery method (e.g., 2-day ground). Afterwards, the user may send a message to the Rapid Answer system to find the particular item by typing "find item", where item is a description of the item (e.g., a unique item number, such as ISBN or SKU number). The Rapid Answer system receives the message from the user and may send to the user a list of one or more items matching the description and a price for each item. The results may include an item identifier for each item and a tracking identifier. After the user receives the message with the search results, the user may select one of the products for purchase. The user purchases the item by replying to the message and typing "buy item XXXXX", where XXXXX (is the item identifier supplied by the Rapid Answer system. The Rapid Answer system then receives the message and attempts to match the tracking number. If tracking number matches the sent tracking identifier for the user, then the system sends a confirmation request message that specifies the prospective purchase. The confirmation request message may have another distinct tracking identifier, or instead may have the same tracking identifier as in the search result message. After the user receives the confirmation request message, the user may reply back by typing "confirm ####", where #### is his/her 4-digit PIN. When the Rapid Answer system receives the confirmation message reply back from the user, it tries to match the tracking identifier and the 4-digit PIN for the user, and if both match proceeds to process the item purchase for the user. The item is then sent to the user's pre-selected delivery address (e.g., home address) via a pre-selected delivery method (e.g., 2-day ground). Additional functionality such as allowing a mobile user to specify the delivery address and/or delivery methods may also be performed.

A user may also in some embodiments be able to pay another user via a mobile device. In such a person-to-person model, users may sign up with a payment service. After signing up with the payment service and supplying at least one payment method, a user may send money to another user via messages with the Rapid Answer system. The user may, for example, send a message to the Rapid Answer system (e.g., "pay@rapid-answer.com") containing the body "pay otheruser@domain.com 10". After the system receives the message, the system may send back a confirmation request message with a tracking identifier. The user receives the confirmation request message from the system and may reply to the message by typing in "confirm ####", where #### is the user's 4-digit PIN. When the system receives the confirmation message back from the user, it tries to match the tracking identifier and the 4-digit PIN. If the tracking identifier and the 4-digit PIN both match, the system may deposit $10 into the account of the other user and obtain the $10 (possibly with an additional processing fee) from the user making the payment.

Although the previous scenarios were discussed as occurring via the Rapid Answer system, in other embodiments some or all the functionality may be provided by other systems, such as the systems of online merchants. In addition, it will be appreciated that some embodiments may utilize various mechanisms to enhance the security of such payment transactions, including capping the amount of money that may be transferred on a per-transaction basis (e.g., a maximum of $50 per transaction) and/or per-time period (e.g., a maximum of $100 per day). Other security mechanisms may include verifying that a generated command message includes information likely to be known by a valid user but unlikely to be known by a malicious user. Such information may include valid tracking identifiers (as described in more detail with reference to FIG. 2Q), shared secrets (e.g., passwords and/or personal information such as mother's maiden name), and/or reference tokens that indicate predefined payment instructions (as described in greater detail with respect to U.S. patent application Ser. No. 11/200,880). Also, the message may be sent securely, such as via HTTP/S or via encryption and hashing prior to being sent to/from the Rapid Answer system.

As previously mentioned, in embodiments where rewards may be allocated to response provider users who provide responses to questions, the rewards may be calculated in various manners. For example, rewards may be allocated based at least in part on feedback from the requester user who asked a question and/or the response provider users who provided responses to the question. Response provider users who provided a response to a question may provide feedback on the responses from other response provider users that provided a response to the question.

As one specific example, feedback from requester users and response provider users regarding a response may consist of rating an answer as great, good, okay, unhelpful, or abusive. The feedback from the various users may be translated into numbers to be used in creating a normalized rating of the response, such as follows: great=+2, good=+1, okay=0, lame=−1, and abusive=−2. These numbers may then be entered into the formula below to calculate a normalized rating of the response.

$$\text{Normalized Rating} = \frac{2*RUR + \sum_{1}^{n} RPUR_n}{n+2}$$

In this formula, RUR stands for the rating supplied by the requester user who supplied the question, $RPUR_n$ represents the rating from response provider user n, and n is the number of response provider users who provided feedback about a response. As shown by the formula, the rating of the requester user who asked the question is worth twice the rating of a response provider user in this example. For example, suppose that the ratings are as shown below:

|  | Requester User's Rating | Response Provider User 1's Rating | Response Provider User 2's Rating | Response Provider User 3's Rating | Response Provider User 4's Rating |
|---|---|---|---|---|---|
| Response Provider User 1's Response | Great | Can't Vote | Lame | Lame | Okay |
| Response Provider User 2's Response | Abusive | Good | Can't Vote | Good | Okay |
| Response Provider User 3's Response | Lame | Okay | No Vote | Can't Vote | Lame |
| Response Provider User 4's Response | No Vote | Good | No Vote | No Vote | Can't Vote |

Then, the normalized rating for response provider user 1 is:

$$\frac{2*\text{Great} + \text{Lame} + \text{Lame} + \text{Okay}}{\text{Number of answer provider user ratings} + 2}$$

As a result, the normalized rating is:

$$\frac{2*2 + -1 + -1 + 0}{3+2} = \frac{2}{5} = +0.4$$

Thus, according to the table below, which maps the normalized rating to experience points, response provider user 1 is awarded +5 experience points for the response.

| RATING | EXPERIENCE POINTS | NORMALIZED RATING |
|---|---|---|
| Great | +20 points | +1.5−+2.0 |
| Good | +10 points | +0.5−+1.5 |
| Okay | +5 points | −0.5−+0.5 |
| Unhelpful | −10 points | −1.5−−0.5 |
| Abusive | −20 points | −2−−1.5 |

In answers that have multiple categories, the same number of experience points may be awarded for each category, while in other embodiments the experience points may be divided between categories. In addition, in some embodiments categories suggested by response provider users may not be used for reward allocation unless the category has been determined to be the best category, such as based on voting by the response provider users and/or in other manners (e.g., based on requester user feedback). However, if so, all categories suggested may be used for other purposes (e.g., available for searching on).

As a continuation of the prior example, response provider user 2 receives a −0.4 normalized rating, and thus receives +5 experience points despite the response being marked as abusive by the requester user. However, in some embodiments, since the response was marked as abusive, the abusive response will nonetheless be tracked and used against response provider user 2 in other manners, such as to temporarily or permanently ban response provider user 2 if response provider user 2 gives too many responses marked as abusive by requester users. Continuing to apply the formula for this example, response provider user 3 receives a −0.75 rating and has 10 experience points deducted for the response (i.e. is allocated −10 experience points).

In some embodiments, if there were not at least a predetermined number (e.g., three) of ratings received, then the response by default is deemed to be okay and is awarded +5 experience points. Thus, response provider user 4 may be awarded +5 points for the response provider user 4's response to the question. In addition, the response provider user with the highest normalized ratings—assuming that it is over a predetermined normalized rating (e.g., +0.5)—may be determined to be the best response and awarded a bonus of +10 experience points. In the event of a tie, the requester user's rating will be utilized to break the tie and if there is still a tie, neither response may be determined to be the best response. Penalties (e.g., deducting 50 experience points per category, tracking the response provider user for possible banning from the Rapid Answer system, etc.) may also be assessed in some embodiments for failing to submit a response after accepting a question. In some embodiments, responses from item provider users may also be rewarded with experience points based on feedback about the item provider user's response and/or the item provider user may provide feedback to be used in the allocation of experience points.

In some embodiments, various security and/or fraud measures may be utilized. For example, in some embodiments, users may sign-in to the Rapid Answer system with a username and password. Various logs of activity may be utilized to prevent and deal with fraud and security breaches. Limits may be placed on the number of questions from the same requester user a response provider user may answer within a set period of time. In addition, the same person may not be allowed to both ask a question as a requester user and answer the question as a response provider user.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for an answer-providing service to interact with third-party users who submit questions to be answered based on responses from other third-party users, the interacting using email messages based on a defined messaging interface of the answer-providing service, the method comprising:

receiving multiple questions to be answered that are each submitted by one of multiple third-party requester users in an email message received from the one requester user, each email message specifying information in a manner in accordance with the defined messaging interface of the answer-providing service;

for each question specified by a requester user via an email message, obtaining one or more responses provided to the question from each of multiple third-party response provider users;

identifying one or more of the obtained responses to be used as an answer to the question;

generating one or more response email messages that provide the answer to the question, each of the generated response email messages including a tracking identifier that is generated by the answer-providing service and associated with the requester user from whom the request was received; and sending the generated response email messages to the requester user from whom the request was received;

receiving one or more command email messages that each indicate an action to be performed on behalf of an indicated requester user, wherein at least some of the received command email messages from indicated requester users are each to request performance of a command that is unrelated to any prior answer to any question; and for each of the received command email messages, automatically determining to perform the action indicated by the message on behalf of the indicated requester user only if the received command email message includes a tracking identifier that was previously generated by the answer-providing service and associated with the indicated requester user for a generated response email message sent to the indicated requester user, the automatic determining being performed by one or more programmed computing systems of the answer-providing service.

2. The method of claim 1 wherein each generated response email message has a unique tracking identifier.

3. The method of claim 1 wherein each requester user has one or more unique tracking identifiers used in generated response email messages sent to the requester user.

4. The method of claim 1 wherein at least some of the received command email messages from indicated requester users are each to provide feedback from an indicated requester user regarding an answer to a question previously provided to the indicated requester user.

5. The method of claim 1 wherein at least some of the email messages specifying information for a question to be answered are each sent by a requester user from a mobile device using wireless communications.

6. The method of claim 1 wherein at least some of the email messages specifying information for a question to be answered each include additional information related to the question that includes one or more tags and a geographical location related to the question.

7. A computer-implemented method for an answer-providing service to interact with users who submit questions using electronic messages based on a defined messaging interface, the submitted questions to be answered by other users, the method comprising:
  receiving indications of multiple questions submitted by multiple users, each of the questions being submitted by one of the multiple users based on one or more electronic messages received from the one user;
  for each of the questions, responding to the question by
    obtaining one or more responses to the question from each of multiple users other than the user who supplied the question; and
    identifying at least some of the obtained responses to be used as an answer to the question; and
    providing the answer to the user who submitted the question as part of one or more electronic messages sent to the user, at least one of the electronic messages sent to the user including a tracking identifier associated with the user by the answer-providing service to enable the user to later send one or more additional electronic messages to the answer-providing service that include the tracking identifier for use by the answer-providing service in determining that the additional messages are from the user;
  receiving from a user a reply message to an electronic message previously sent to the user as part of sending an answer to a question to the user, the reply message including the tracking identifier included in the previously sent electronic message and a command from the user that is not specific to the answer for which the electronic message was previously sent; and
  automatically determining to perform the command based at least in part on the reply message including the tracking identifier included in the previously sent electronic message, the automatic determining being performed by one or more programmed computing systems of the answer-providing service.

8. The method of claim 7 wherein at least some of the electronic messages used by users to submit questions are email messages.

9. The method of claim 8 wherein the defined messaging interface specifies how one or more types of information for the question are to be indicated in an email message.

10. The method of claim 7 wherein at least some of the electronic messages used by users to submit questions are at least one of short message service messages sent from wireless devices and multimedia messaging service messages sent from wireless devices.

11. The method of claim 7 wherein at least some of the electronic messages used by users to submit questions are instant messaging messages.

12. The method of claim 7 wherein the defined messaging interface includes an application programming interface ("API") that specifies one or more types of information messages that may be submitted, and wherein at least some of the electronic messages used by users to submit questions are messages sent via the API.

13. The method of claim 12 wherein the API is based on use of one or more Web services.

14. The method of claim 7 wherein at least some of the electronic messages used by users to submit questions each include an indication of a question being submitted and additional information related to the question that is specified in a manner in accordance with the defined messaging interface.

15. The method of claim 14 wherein the additional information for each of at least some of the questions includes one or more tags for the question.

16. The method of claim 15 wherein the additional information for each of the at least some questions includes an indicated geographical location related to the question.

17. The method of claim 16 wherein the additional information for each of the at least some questions includes an indication of a desired service in the indicated geographical location for the question.

18. The method of claim 16 wherein the additional information for each of the at least some questions includes an indication of a desired product to be acquired in the indicated geographical location for the question.

19. The method of claim 7 wherein the providing of the answer for one of the questions submitted via one or more electronic messages includes sending the answer to the user who submitted the question via one or more email messages sent to that user.

20. The method of claim 7 wherein the providing of the answer for one of the questions submitted via one or more electronic messages includes automatically generating the tracking identifier to be included in at least one of the those electronic messages such that the generated tracking identifier is unique.

21. The method of claim 7 further comprising
  receiving from a user a second reply message to an electronic message previously sent to the user as part of sending an answer to a question to the user, the second reply message including the tracking identifier included in the previously sent electronic message, wherein the second reply message contains feedback from the user related to the answer for which the electronic message was previously sent; and
  determining to use the feedback based at least in part on the second reply message including the tracking identifier included in the previously sent electronic message.

22. The method of claim 7 wherein the command from the user is an instruction to make an indicated payment to another indicated user.

23. The method of claim 22 wherein the instruction is further to obtain the indicated payment from an existing account of the user.

24. The method of claim 7 wherein at least some of the multiple questions submitted by the multiple users are each associated with an indication that the user who submitted the question has prepaid for the question submission, and wherein the command is an instruction to pre-pay for a specified number of future question submissions.

25. The method of claim 24 wherein the instruction to pre-pay for a specified number of future question submissions for a user is further to obtain payment from an existing account of that user.

26. The method of claim 7 wherein the command from the user is an instruction to purchase an indicated item for the user.

27. The method of claim 26 wherein the instruction is further to obtain payment for the purchase from an existing account of the user.

28. The method of claim 7 wherein the command from the user is at least one of a request for information about an account of the user, an instruction to perform a search of previously answered questions, an instruction to provide an answer for a previously submitted question, an instruction to perform a search of information accessible from one or more sources external to the answer-providing service, a request for information about available topics for which the user can subscribe to receive corresponding information, a request to subscribe to an indicated topic such that the user will receive corresponding information, a request to unsubscribe to an indicated topic such that the user will no longer receive corresponding information, a request to join a question so as to receive indications of responses and other information corresponding to the question, a request to unjoin a question so as to no longer receive indications of responses and other information corresponding to the question, and a request to block an indicated user so as to no longer receive information related to the indicated user.

29. The method of claim 7 wherein the determining to perform the command received from the user is further based on, after sending a confirmation request electronic message to the user that includes a second tracking identifier distinct from the tracking identifier included in the previously sent electronic message, receiving a confirmation reply message from the user to the sent confirmation request electronic message such that the confirmation reply message includes the second tracking identifier.

30. The method of claim 7 wherein one of the multiple questions is submitted by a requester user, and wherein the obtaining of one of the responses to the one question includes obtaining the one response from a response provider user other than the requester user via an electronic message sent by the response provider user.

31. The method of claim 7 wherein each of the sent electronic messages has a unique tracking identifier.

32. The method of claim 7 wherein at least some of the electronic messages used by users to submit questions are each sent by a requester user from a mobile device using wireless communications.

33. A non-transitory computer-readable medium whose contents configure a computing device to facilitate interactions with users who submit requests using electronic messages in order to obtain replies from other users, by performing a method comprising:
 receiving an indication of a request supplied by a first user via one or more electronic messages;
 automatically generating a reply to the request based on one or more responses obtained from one or more users other than the first user; and
 automatically sending the reply to the first user via one or more other electronic messages, at least one of the other electronic messages including a tracking identifier associated with the first user by the answer-providing service to enable the first user to later send one or more additional messages that include information based on the tracking identifier for use in determining that the additional messages are from the first user;
 after the automatic sending to the first user of the reply to the request, receiving from the first user a command message including a command unrelated to the reply to the request; and
 automatically determining to perform the command based at least in part on the command message including the tracking identifier included in the previously sent at least one of the other electronic messages, the automatic determining being performed by the configured computing device.

34. The non-transitory computer-readable medium of claim 33 wherein the request includes a question and the reply includes an answer to the question, and wherein the reply includes multiple responses received from multiple users other than the first user.

35. The non-transitory computer-readable medium of claim 34 wherein the configured computing device performs the method on behalf of an answer-providing service, wherein the one or more electronic messages supplied by the first user are each email messages specified by the first user in accordance with a defined messaging interface of the answer-providing service, and wherein the automatic sending of the reply to the first user via one or more other electronic messages that include the tracking identifier associated with the first user includes automatically generating a new tracking identifier unique to the first user and associating the new tracking identifier with the first user.

36. The non-transitory computer-readable medium of claim 33 wherein the computer-readable medium is a memory of the configured computing device.

37. The non-transitory computer-readable medium of claim 33 wherein the contents are instructions that when executed program the configured computing device to perform the method.

38. A computing device configured to enable interactions via electronic messages to submit questions to be answered by other users, comprising:
 one or more processors;
 a first component configured to when executed by at least one of the one or more processors, respond to each of multiple questions that are each supplied by a requester via one or more electronic messages, by
  obtaining one or more responses to the question from one or more users; and
  generating an answer to the question based on at least one of the obtained responses;
 a second component configured to, when executed by at least one of the one or more processors, and for each of the multiple questions, provide the answer to the requester who supplied the question as part of one or more electronic messages that include a generated tracking identifier associated with the requester for later use in one or more replies sent from the requester that include the tracking identifier; and
 a third component configured to, when executed by at least one of the one or more processors, respond to an indication of a command not specific to a response to a previous question and supplied by a requester via a reply message, the responding including determining whether to perform the command based at least in part on whether the reply message including the indication of the command also includes the tracking identifier included in a previously sent electronic message to the requester supplying the indication of the command.

39. The computing device of claim 38 wherein the computing device operates on behalf of an answer-providing service, wherein at least some of the requesters are users, wherein the one or more electronic messages supplied by the requesters are each email messages specified in accordance with a defined messaging interface of the answer-providing service, and wherein the providing of the answer to a requester for each of at least some of the questions includes automatically generating a new tracking identifier unique to the requester and associating the new tracking identifier with the requester.

40. The computing device of claim 38 wherein the first, the second and the third components each include software instructions for execution in memory of the computing device.

* * * * *